(12) United States Patent
Martin et al.

(10) Patent No.: US 12,035,845 B1
(45) Date of Patent: Jul. 16, 2024

(54) SYSTEMS AND METHODS FOR COOKING PIZZA

(71) Applicant: SharkNinja Operating LLC, Needham, MA (US)

(72) Inventors: Christopher T. Martin, North Attleboro, MA (US); Nicholas Chow, Boston, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/307,595

(22) Filed: Apr. 26, 2023

(51) Int. Cl.
*H05B 3/68* (2006.01)
*A47J 37/06* (2006.01)

(52) U.S. Cl.
CPC ....... *A47J 37/0658* (2013.01); *A47J 37/0629* (2013.01)

(58) Field of Classification Search
CPC ................. A47J 37/0658; A47J 37/0629
USPC ........................................................ 99/331
See application file for complete search history.

(56) References Cited

U.S. PATENT DOCUMENTS

| | | |
|---|---|---|
| 195,383 A | 9/1877 | Montross |
| 213,694 A | 3/1879 | Sandner, Jr. |
| 231,911 A | 9/1880 | Holliday |
| 325,645 A | 9/1885 | Armington |
| 371,892 A | 10/1887 | Kahn |
| 416,160 A | 12/1889 | Galbraith |
| 418,721 A | 1/1890 | Hoogerzeil |
| 436,788 A | 9/1890 | Jewett |
| 456,000 A | 7/1891 | Graves |
| 467,292 A | 1/1892 | Hoogerzeil |
| 519,606 A | 5/1894 | Kaempen, Jr. |
| 688,639 A | 12/1901 | Harton |
| 969,340 A | 9/1910 | Clark |

(Continued)

FOREIGN PATENT DOCUMENTS

| | | |
|---|---|---|
| AU | 511593 B2 | 8/1980 |
| AU | 2014208185 B2 | 8/2015 |

(Continued)

OTHER PUBLICATIONS

U.S. Appl. No. 17/663,582 entitled "Methods and Systems for Open-Loop Ignition of a Smoke Generator Fuel Source" filed May 16, 2022, 46 pages.

(Continued)

*Primary Examiner* — Jimmy Chou
(74) *Attorney, Agent, or Firm* — Mintz, Levin, Cohn, Ferris, Glovsky and Popeo, P.C.

(57) ABSTRACT

In general, cooking devices having at least one electric heating element and that are configured to cook various foods, including pizza, are provided. In some embodiments, the cooking device can include a housing having a base, a movable door coupled to the base that together define an interior cooking chamber. A cooking surface, such as a cooking stone, can be disposed proximate a heating element within the cooking chamber such that food, such as a pizza, can be placed on top of the cooking stone when inserted into the interior chamber. The heating element can be in operable communication with a controller configured to adjust the amount of heat supplied by the heating element to the interior chamber to optimize the cooking of a food, such as pizza, placed inside the interior chamber.

12 Claims, 10 Drawing Sheets

(56) References Cited

U.S. PATENT DOCUMENTS

| | | | |
|---|---|---|---|
| 1,262,659 A | 4/1918 | Foster | |
| 1,429,870 A | 9/1922 | Arvin | |
| 1,507,778 A | 9/1924 | Keavey et al. | |
| 1,582,543 A | 4/1926 | Rowden | |
| 1,627,405 A | 5/1927 | Prenveille et al. | |
| 1,628,895 A | 5/1927 | William | |
| 1,632,719 A | 6/1927 | White | |
| 1,776,475 A | 9/1930 | Ernest | |
| 1,785,514 A | 12/1930 | Chandler et al. | |
| 1,793,955 A | 2/1931 | Otte | |
| 1,831,652 A | 11/1931 | Chandler et al. | |
| 1,851,854 A | 3/1932 | Lindemann et al. | |
| 1,894,268 A | 1/1933 | Forsyth et al. | |
| 1,938,470 A | 12/1933 | Jacob et al. | |
| 1,958,348 A | 5/1934 | Odis | |
| 1,970,343 A | 8/1934 | Sherman | |
| 2,132,737 A | 10/1938 | Kahn | |
| 2,155,654 A | 4/1939 | Haley | |
| 2,255,129 A | 9/1941 | Rogers | |
| 2,296,950 A | 9/1942 | Roedl | |
| 2,352,613 A | 7/1944 | Bradbury | |
| 2,447,184 A | 8/1948 | Jones | |
| 2,486,564 A | 11/1949 | Kamin | |
| 2,657,110 A | 10/1953 | Feder | |
| 2,682,263 A | 6/1954 | Brodbeck | |
| 2,744,994 A | 5/1956 | Harry et al. | |
| 3,016,276 A | 1/1962 | Morse | |
| 3,106,202 A | 10/1963 | Arduna | |
| 3,146,338 A | 8/1964 | Jerome | |
| 3,781,525 A | 12/1973 | Joeckel | |
| 3,830,220 A | 8/1974 | Demetreon | |
| 4,149,518 A | 4/1979 | Schmidt et al. | |
| 4,637,373 A | 1/1987 | Shirai et al. | |
| 4,649,810 A | 3/1987 | Wong | |
| 4,683,871 A | 8/1987 | Salvi | |
| 4,829,158 A | 5/1989 | Burnham | |
| 4,865,219 A | 9/1989 | Logan et al. | |
| 4,892,085 A | 1/1990 | Salvi | |
| D337,032 S | 7/1993 | Galati | |
| 5,338,922 A | 8/1994 | Kim et al. | |
| 5,355,779 A | 10/1994 | Obrien et al. | |
| 5,365,918 A | 11/1994 | Smith et al. | |
| 5,522,308 A * | 6/1996 | Kayashima | G05D 23/2401 |
| | | | 219/442 |
| 5,674,421 A | 10/1997 | Beaver et al. | |
| 6,140,621 A | 10/2000 | Ho et al. | |
| RE37,152 E | 5/2001 | Obrien et al. | |
| 6,437,291 B1 | 8/2002 | Hopponen | |
| 6,444,954 B1 | 9/2002 | Blankenship | |
| 6,509,550 B1 | 1/2003 | Li | |
| 6,621,053 B1 | 9/2003 | Wensink et al. | |
| 6,930,286 B2 | 8/2005 | Kim | |
| 7,026,579 B2 * | 4/2006 | Burtea | A21B 1/48 |
| | | | 99/443 C |
| 7,087,862 B1 | 8/2006 | Shaffer et al. | |
| 7,105,778 B1 | 9/2006 | Delong et al. | |
| 7,173,217 B2 | 2/2007 | De | |
| 7,213,592 B2 | 5/2007 | Fischhaber et al. | |
| 7,225,730 B2 | 6/2007 | Backus et al. | |
| 7,282,672 B2 | 10/2007 | Wurm | |
| D563,179 S | 3/2008 | Minidis | |
| D564,283 S | 3/2008 | Leung et al. | |
| 7,424,849 B2 | 9/2008 | Backus et al. | |
| 7,448,508 B2 | 11/2008 | Babucke et al. | |
| D585,235 S | 1/2009 | Tetreault et al. | |
| 7,626,142 B2 | 12/2009 | Backus et al. | |
| 7,686,010 B2 | 3/2010 | Gustavsen | |
| 7,800,023 B2 * | 9/2010 | Burtea | A21B 1/02 |
| | | | 126/92 AC |
| 8,020,548 B2 | 9/2011 | Bartmann et al. | |
| 8,047,198 B2 | 11/2011 | Meyer et al. | |
| 8,047,199 B2 | 11/2011 | Le et al. | |
| 8,201,552 B2 | 6/2012 | Ploof et al. | |
| 8,267,257 B2 | 9/2012 | Doyal | |
| 8,308,250 B2 | 11/2012 | Koehler | |
| 8,327,837 B2 | 12/2012 | Nam et al. | |
| D678,005 S | 3/2013 | Zemel et al. | |
| 8,439,028 B2 | 5/2013 | Haberkamm et al. | |
| 8,481,894 B2 | 7/2013 | Robin et al. | |
| 8,490,801 B2 | 7/2013 | Smith et al. | |
| 8,573,720 B2 | 11/2013 | Wittgrebe | |
| 8,578,927 B2 | 11/2013 | Gustavsen | |
| 8,602,019 B2 | 12/2013 | Baker et al. | |
| 8,646,444 B2 | 2/2014 | Williams et al. | |
| 8,669,500 B2 * | 3/2014 | Hensel | A47J 37/0807 |
| | | | 219/483 |
| 8,733,862 B1 | 5/2014 | Armstrong et al. | |
| 8,820,314 B1 | 9/2014 | Johnson et al. | |
| 8,820,689 B2 | 9/2014 | Reidt et al. | |
| 8,899,426 B2 | 12/2014 | Dunn | |
| 8,919,338 B2 | 12/2014 | Mcnamee et al. | |
| 8,919,339 B2 | 12/2014 | Mazzetti et al. | |
| 9,022,018 B2 | 5/2015 | Hensel | |
| 9,052,118 B2 | 6/2015 | Metcalf et al. | |
| 9,078,517 B2 | 7/2015 | Rehage | |
| 9,175,860 B2 | 11/2015 | Padilha et al. | |
| 9,468,336 B2 | 10/2016 | Mcquillan | |
| 9,541,295 B2 | 1/2017 | Adelmann et al. | |
| 9,631,820 B2 | 4/2017 | Hensel | |
| 9,681,773 B2 | 6/2017 | Mckee et al. | |
| 9,844,297 B2 | 12/2017 | Volatier et al. | |
| 9,863,645 B2 | 1/2018 | Adelmann et al. | |
| 9,874,353 B2 | 1/2018 | Thabit | |
| 9,907,435 B2 | 3/2018 | Kohler et al. | |
| 9,939,160 B2 | 4/2018 | Kim et al. | |
| 9,964,312 B2 | 5/2018 | Deng et al. | |
| 10,101,038 B2 | 10/2018 | Kim et al. | |
| 10,132,502 B2 | 11/2018 | Contarino, Jr. | |
| 10,247,424 B2 | 4/2019 | Adelmann et al. | |
| 10,260,757 B2 | 4/2019 | Stewart et al. | |
| 10,352,073 B2 | 7/2019 | Lee et al. | |
| 10,383,477 B2 | 8/2019 | Payen et al. | |
| 10,405,699 B2 | 9/2019 | Contarino, Jr. | |
| 10,429,077 B2 | 10/2019 | Kaiser et al. | |
| 10,520,202 B2 | 12/2019 | Delrue et al. | |
| 10,524,616 B2 | 1/2020 | Contarino, Jr. | |
| 10,537,199 B2 | 1/2020 | Knappenberger et al. | |
| 10,548,396 B1 | 2/2020 | Hong | |
| 10,551,071 B2 | 2/2020 | Bianchi et al. | |
| 10,561,277 B1 | 2/2020 | Swayne et al. | |
| 10,575,680 B2 | 3/2020 | Fagg et al. | |
| 10,591,168 B2 | 3/2020 | Yang et al. | |
| 10,634,362 B2 | 4/2020 | Trice et al. | |
| 10,641,500 B2 | 5/2020 | Yun | |
| 10,655,864 B2 | 5/2020 | Howard et al. | |
| 10,682,010 B2 | 6/2020 | Hoare et al. | |
| 10,712,018 B2 | 7/2020 | Adelmann et al. | |
| 10,718,671 B2 | 7/2020 | Allen | |
| D892,532 S | 8/2020 | Gushwa et al. | |
| 10,765,119 B2 | 9/2020 | Johnson et al. | |
| 10,808,944 B2 | 10/2020 | Bianchi et al. | |
| 10,837,652 B2 | 11/2020 | Balekundri et al. | |
| 10,842,315 B1 | 11/2020 | Swinney | |
| 10,845,062 B2 | 11/2020 | Harward et al. | |
| 10,905,281 B2 | 2/2021 | Delrue et al. | |
| 10,941,945 B2 | 3/2021 | Tapaninaho | |
| 11,026,542 B2 | 6/2021 | Pruitt et al. | |
| 11,035,576 B2 | 6/2021 | Johnson et al. | |
| 11,045,047 B2 | 6/2021 | Popeil et al. | |
| 11,071,403 B2 | 7/2021 | Staton et al. | |
| D928,549 S | 8/2021 | Yamamoto | |
| 11,076,717 B2 | 8/2021 | Glucksman | |
| 11,105,515 B2 | 8/2021 | Lee et al. | |
| 11,112,125 B2 | 9/2021 | Stewart et al. | |
| 11,129,244 B2 | 9/2021 | Hoare et al. | |
| 11,172,780 B2 | 11/2021 | Home | |
| 11,190,015 B2 | 11/2021 | Marsh-croft et al. | |
| 11,199,331 B2 | 12/2021 | Mills et al. | |
| 11,213,165 B2 | 1/2022 | Kammerer | |
| 11,286,698 B2 | 3/2022 | Braden et al. | |
| 11,304,421 B2 | 4/2022 | Handwerker | |
| 11,311,143 B2 | 4/2022 | Peter | |
| 11,452,404 B2 | 9/2022 | Anderson | |
| 11,454,677 B2 | 9/2022 | Knappenberger et al. | |

(56) References Cited

U.S. PATENT DOCUMENTS

| | | |
|---|---|---|
| 11,464,360 B2 | 10/2022 | Goldberg |
| 11,478,107 B2 | 10/2022 | Volatier |
| 11,523,616 B2 | 12/2022 | Mecsaci |
| 11,536,048 B2 | 12/2022 | Kim et al. |
| 11,598,532 B2 | 3/2023 | Reid et al. |
| D983,602 S | 4/2023 | Pruitt et al. |
| 11,753,856 B2 | 9/2023 | Shin et al. |
| 2003/0056658 A1* | 3/2003 | Jones ............ A47J 37/0857 99/443 C |
| 2005/0217658 A1 | 10/2005 | Sozo et al. |
| 2005/0274373 A1* | 12/2005 | Pesonen ............ F27B 9/3005 126/21 A |
| 2007/0277678 A1 | 12/2007 | Mangano |
| 2010/0006558 A1 | 1/2010 | McLoughlin et al. |
| 2011/0283895 A1* | 11/2011 | Veltrop ............ A23L 5/15 392/416 |
| 2012/0192851 A1 | 8/2012 | Hensel et al. |
| 2013/0167829 A1 | 7/2013 | Lin |
| 2013/0167830 A1 | 7/2013 | Lin |
| 2013/0233182 A1 | 9/2013 | Hunt et al. |
| 2014/0021191 A1 | 1/2014 | Moon et al. |
| 2014/0035452 A1 | 2/2014 | Nickelson et al. |
| 2014/0196609 A1 | 7/2014 | Snyman |
| 2014/0220196 A1* | 8/2014 | Veloo ............ A23L 5/10 426/233 |
| 2016/0003294 A1 | 1/2016 | Lindinger |
| 2017/0238751 A1 | 8/2017 | Vengroff |
| 2017/0303685 A1 | 10/2017 | Rehage et al. |
| 2018/0317705 A1 | 11/2018 | Roy |
| 2018/0333004 A1 | 11/2018 | De' Longhi et al. |
| 2019/0056117 A1 | 2/2019 | Rehage et al. |
| 2019/0059646 A1 | 2/2019 | Uno et al. |
| 2019/0107291 A1 | 4/2019 | Cetintas |
| 2019/0186756 A1 | 6/2019 | Tiefnig et al. |
| 2019/0290062 A1 | 9/2019 | Prieto et al. |
| 2019/0316781 A1 | 10/2019 | Kim et al. |
| 2019/0327796 A1 | 10/2019 | Hannah et al. |
| 2020/0201414 A1 | 6/2020 | Knappenberger et al. |
| 2020/0224882 A1 | 7/2020 | Kim et al. |
| 2020/0224883 A1 | 7/2020 | Kim et al. |
| 2020/0224884 A1 | 7/2020 | Kwag et al. |
| 2020/0229276 A1 | 7/2020 | Kim et al. |
| 2020/0284438 A1 | 9/2020 | Gigante et al. |
| 2020/0315389 A1 | 10/2020 | Stewart et al. |
| 2020/0345176 A1 | 11/2020 | Bert |
| 2020/0405085 A1 | 12/2020 | Dos Santos et al. |
| 2020/0405086 A1 | 12/2020 | Dos Santos et al. |
| 2021/0015300 A1 | 1/2021 | Nernberger et al. |
| 2021/0116134 A1 | 4/2021 | Hu et al. |
| 2021/0121004 A1* | 4/2021 | Elliston ............ A47J 37/0754 |
| 2021/0153508 A1 | 5/2021 | Gozney |
| 2021/0161151 A1 | 6/2021 | Thorogood et al. |
| 2021/0204371 A1 | 7/2021 | Asami |
| 2021/0222888 A1 | 7/2021 | Ceron et al. |
| 2021/0274968 A1 | 9/2021 | Steiner et al. |
| 2021/0293416 A1 | 9/2021 | Homburg et al. |
| 2021/0369051 A1 | 12/2021 | Thorogood et al. |
| 2021/0381695 A1 | 12/2021 | Rehage et al. |
| 2021/0388992 A1 | 12/2021 | Thorogood et al. |
| 2021/0388993 A1 | 12/2021 | Ceron et al. |
| 2021/0392904 A1 | 12/2021 | Raio et al. |
| 2022/0007689 A1 | 1/2022 | Baldwin |
| 2022/0015575 A1 | 1/2022 | Harper |
| 2022/0087473 A1 | 3/2022 | Kim et al. |
| 2022/0090794 A1 | 3/2022 | Yun et al. |
| 2022/0095834 A1 | 3/2022 | Thorogood et al. |
| 2022/0160172 A1 | 5/2022 | Kwag et al. |
| 2022/0167789 A1 | 6/2022 | Kim et al. |
| 2022/0192421 A1 | 6/2022 | Bert |
| 2022/0223025 A1 | 7/2022 | Allen, Sr. |
| 2022/0304505 A1 | 9/2022 | Tapaninaho |
| 2022/0322874 A1 | 10/2022 | Marsh-croft et al. |
| 2022/0322877 A1 | 10/2022 | Greer et al. |
| 2022/0361711 A1* | 11/2022 | Huang ............ A47J 37/0641 |
| 2023/0000284 A1 | 1/2023 | Smith et al. |
| 2023/0038171 A1 | 2/2023 | Stidston et al. |

FOREIGN PATENT DOCUMENTS

| | | |
|---|---|---|
| AU | 2020202899 A1 | 11/2020 |
| AU | 2020206084 B9 | 5/2023 |
| CA | 2552839 A1 | 1/2007 |
| CA | 2867330 A1 | 10/2013 |
| CA | 2922423 A1 | 10/2015 |
| CN | 102362123 A | 2/2012 |
| CN | 101953645 B | 1/2016 |
| CN | 104172955 B | 1/2017 |
| CN | 206053603 U | 3/2017 |
| CN | 106821025 A | 6/2017 |
| CN | 106821031 A | 6/2017 |
| CN | 104153157 B | 8/2017 |
| CN | 107374390 A | 11/2017 |
| CN | 107647794 A | 2/2018 |
| CN | 107684357 A | 2/2018 |
| CN | 107692865 A | 2/2018 |
| CN | 107788860 A | 3/2018 |
| CN | 207355968 U | 5/2018 |
| CN | 108309073 A | 7/2018 |
| CN | 109691902 A | 4/2019 |
| CN | 208973522 U | 6/2019 |
| CN | 107514662 B | 9/2019 |
| CN | 110412917 A | 11/2019 |
| CN | 110513004 A | 11/2019 |
| CN | 110693348 A | 1/2020 |
| CN | 110811351 A | 2/2020 |
| CN | 110840284 A | 2/2020 |
| CN | 110953616 A | 4/2020 |
| CN | 110973995 A | 4/2020 |
| CN | 111012199 A | 4/2020 |
| CN | 210471883 U | 5/2020 |
| CN | 108552970 B | 7/2020 |
| CN | 110123157 B | 8/2020 |
| CN | 112244658 A | 1/2021 |
| CN | 112690666 A | 4/2021 |
| CN | 110403452 B | 5/2021 |
| CN | 110664268 B | 5/2021 |
| CN | 110805936 B | 5/2021 |
| CN | 112806866 A | 5/2021 |
| CN | 112971546 A | 6/2021 |
| CN | 112971550 A | 6/2021 |
| CN | 113143047 A | 7/2021 |
| CN | 112263140 B | 10/2021 |
| CN | 113944942 A | 1/2022 |
| CN | 111010856 B | 3/2022 |
| DE | 2850366 A1 | 5/1980 |
| DE | 102010008420 A1 | 8/2011 |
| EP | 0147815 A2 | 7/1985 |
| EP | 0151192 A1 | 8/1985 |
| EP | 0443329 A2 | 8/1991 |
| EP | 0578360 B1 | 12/1995 |
| EP | 1400195 B1 | 2/2005 |
| EP | 1403587 B1 | 5/2006 |
| EP | 1466546 B1 | 11/2006 |
| EP | 1580145 B1 | 4/2007 |
| EP | 1419722 B1 | 9/2007 |
| EP | 1800579 B1 | 12/2008 |
| EP | 1865264 B1 | 5/2009 |
| EP | 1795096 B1 | 6/2009 |
| EP | 1776914 B1 | 9/2009 |
| EP | 2042811 B1 | 3/2011 |
| EP | 2096359 B1 | 5/2011 |
| EP | 2204115 B1 | 8/2011 |
| EP | 2093497 B1 | 5/2013 |
| EP | 2703736 B1 | 10/2015 |
| EP | 2093493 B1 | 2/2016 |
| EP | 2093495 B1 | 2/2016 |
| EP | 1553350 B1 | 3/2016 |
| EP | 2538144 B1 | 8/2016 |
| EP | 1840473 B1 | 11/2016 |
| EP | 2615380 B1 | 3/2017 |
| EP | 2843316 B1 | 6/2017 |
| EP | 2950002 B1 | 7/2017 |

(56) References Cited

FOREIGN PATENT DOCUMENTS

| | | | |
|---|---|---|---|
| EP | 1918644 | B1 | 10/2017 |
| EP | 2757322 | B1 | 12/2017 |
| EP | 2292980 | B1 | 3/2018 |
| EP | 2339240 | B1 | 8/2018 |
| EP | 2739191 | B1 | 9/2018 |
| EP | 3031328 | B1 | 10/2018 |
| EP | 3399836 | A1 | 11/2018 |
| EP | 1553347 | B1 | 1/2019 |
| EP | 2913593 | B1 | 1/2019 |
| EP | 2730848 | B1 | 6/2019 |
| EP | 3287050 | B1 | 6/2019 |
| EP | 2436990 | B1 | 7/2019 |
| EP | 3196856 | B1 | 8/2019 |
| EP | 2597378 | B1 | 1/2020 |
| EP | 3217760 | B1 | 6/2020 |
| EP | 3712508 | A1 | 9/2020 |
| EP | 3427616 | B1 | 1/2021 |
| EP | 3771867 | A1 | 2/2021 |
| EP | 3838067 | A1 | 6/2021 |
| EP | 3875858 | A1 | 9/2021 |
| EP | 3944794 | A1 | 2/2022 |
| EP | 3450855 | B1 | 6/2022 |
| EP | 3910242 | A4 | 11/2022 |
| EP | 3949815 | B1 | 12/2022 |
| FR | 2810067 | B3 | 4/2002 |
| FR | 2893832 | B1 | 2/2012 |
| FR | 3079600 | B1 | 9/2020 |
| FR | 3117325 | A1 | 6/2022 |
| GB | 1575264 | A | 9/1980 |
| GB | 2602928 | B | 11/2022 |
| JP | 2008513724 | A | 5/2008 |
| JP | 2019098149 | A | 6/2019 |
| KR | 20200087653 | A | 7/2020 |
| KR | 20200087684 | A | 7/2020 |
| KR | 20200087687 | A | 7/2020 |
| KR | 20210007294 | A | 1/2021 |
| KR | 102213630 | B1 | 2/2021 |
| KR | 102364484 | B1 | 2/2022 |
| KR | 102368211 | B1 | 2/2022 |
| KR | 102369772 | B1 | 3/2022 |
| KR | 102432825 | B1 | 8/2022 |
| KR | 102522669 | B1 | 4/2023 |
| WO | WO-2006098646 | A1 * | 9/2006 ............ A47J 27/026 |
| WO | 2007077163 | A1 | 7/2007 |
| WO | 2009107016 | A1 | 9/2009 |
| WO | 2011120698 | A1 | 10/2011 |
| WO | 2012117274 | A1 | 9/2012 |
| WO | 2014082828 | A1 | 6/2014 |
| WO | 2017013331 | A1 | 1/2017 |
| WO | 2017015270 | A1 | 1/2017 |
| WO | 2017085393 | A1 | 5/2017 |
| WO | 2017087329 | A1 | 5/2017 |
| WO | 2018024558 | A1 | 2/2018 |
| WO | 2019203444 | A1 | 10/2019 |
| WO | 2020043427 | A1 | 3/2020 |
| WO | 2020135986 | A1 | 7/2020 |
| WO | 2020145756 | A1 | 7/2020 |
| WO | 2020145758 | A1 | 7/2020 |
| WO | 2020145760 | A1 | 7/2020 |
| WO | 2020145764 | A1 | 7/2020 |
| WO | 2020256192 | A1 | 12/2020 |
| WO | 2021165198 | A1 | 8/2021 |
| WO | 2021165200 | A1 | 8/2021 |
| WO | 2021165261 | A1 | 8/2021 |
| WO | 2021165706 | A3 | 10/2021 |
| WO | 2022017792 | A1 | 1/2022 |
| WO | 2022051800 | A1 | 3/2022 |
| WO | 2022053226 | A1 | 3/2022 |
| WO | 2022106474 | A1 | 5/2022 |
| WO | 2022216347 | A1 | 10/2022 |
| WO | 2023272336 | A1 | 1/2023 |
| WO | 2023004464 | A1 | 2/2023 |

OTHER PUBLICATIONS

U.S. Appl. No. 17/733,237 entitled "Grill System with Smoke Assembly" filed Apr. 29, 2022, 46 pages.
U.S. Appl. No. 18/079,781 entitled "Grill Systems" filed May 16, 2022, 53 pages.

* cited by examiner

SYSTEMS AND METHODS FOR COOKING PIZZA

FIELD

An oven system for cooking food, such as pizza, and methods for using the same, are provided.

BACKGROUND

Pizzas can be made in a variety of styles (e.g., Neapolitan, New York Style, etc.) and can be prepared and cooked using techniques that vary based on the desired type of pizza style. Pizza ovens can provide for the cooking of pizza by using one or more heating elements to transfer heat to the pizza. However, some pizza ovens, such as those that use electric heating elements, may be limited in the ways by which they can transfer heat to the pizza during cooking and thus may be unable to cook a pizza in accordance with the cooking technique required to achieve certain pizza styles. For example, to successfully cook Neapolitan pizzas, the pizza oven must be capable of imparting a high level of heat to the crust of the pizza. Given the high levels of heat needed to cook such a pizza, it can be challenging to repeatedly cook Neapolitan pizzas with a short cycle time.

Accordingly, there remains a need for an improved oven system for cooking various foods, including pizza.

SUMMARY

An oven system for cooking food, such as pizza, and methods for using the same, are provided. Related apparatuses and techniques are also described.

In one aspect, a cooking device is described. The cooking device can include a housing defining an interior chamber, an upper heating element disposed within the interior chamber and on an upper surface of the housing and configured to supply heat to the interior chamber. The cooking device can also include a lower heating element disposed within the interior chamber, on a lower surface of the housing, proximate a cooking surface disposed within the interior chamber and configured to receive food to be cooked, and the lower heating element can be configured to supply heat to the interior chamber. The lower surface can be opposite the upper surface. The cooking device can also include a controller in operable communication with the upper heating element and the lower heating element. The controller can be configured to receive temperature data characterizing a temperature of air within an upper region of the interior chamber above a cooking surface and a temperature of air within a lower region of the interior chamber below the cooking surface, to determine a ratio between an amount of heat to be supplied to the interior chamber by the upper heating element and an amount of heat to be supplied to the interior chamber by the lower heating element based on the temperature data, and to cause the heat to be supplied to the interior chamber by at least one of the upper and lower heating elements based on the determined ratio.

One or more of the following features can be included in any feasible combination. For example, the controller can be configured to receive data characterizing a mode of cooking the food and to determine the ratio based on the received data. For example, the cooking device can further include an upper temperature sensor disposed within the interior chamber and proximate the upper heating element, and the upper temperature sensor can be configured to measure the temperature of the air within the interior chamber above the cooking surface. For example, the cooking device can further include a lower temperature sensor disposed within the interior chamber and proximate the lower heating element and the cooking surface, and the lower temperature sensor can be configured to measure the temperature of at least one of the cooking surface and the air within the lower region of the interior chamber. For example, the controller can be configured to cause the heat to be supplied to the interior chamber by at least one of the upper and lower heating elements based on the determined ratio when the controller is operating in a pre-heating state. For example, the controller can be configured to adjust the amount of the heat supplied to the interior chamber by the upper heating element and the amount of the heat supplied to the interior chamber by the lower heating element after a period of time, and the period of time can be determined based on the determined ratio. For example, the controller can be configured to adjust the amount of the heat supplied to the interior chamber by the upper heating element and the amount of the heat supplied to the interior chamber by the lower heating element when the temperature of the air within the lower region of the interior chamber is less than a target temperature.

In another aspect, a system is provided and can include at least one data processor and memory storing instructions configured to cause the at least one data processor to perform operations described herein. The operations can include receiving temperature data characterizing a temperature of air within an upper region of an interior chamber of a cooking device, the upper region above a cooking surface, and characterizing a temperature of air within a lower region of the interior chamber, the lower region below the cooking surface; determining, based on the received temperature data, a ratio between an amount of heat to be supplied to the interior chamber by an upper heating element and an amount of heat to be supplied to the interior chamber by a lower heating element, the upper heating element and the lower heating element being disposed in the interior chamber at opposing surfaces of the interior chamber; and causing heat to be supplied to the interior chamber by at least one of the upper and lower heating elements based on the determined ratio.

One or more of the following features can be included in any feasible combination. For example, the operations can further include receiving mode data characterizing a mode of cooking the food, and wherein the ratio is determined based on the received mode data. For example, the causing of the heat to be supplied to the interior chamber can occur when the cooking device is operating in a pre-heating state. For example, the operations can further include determining a period of time based on the determined ratio, the period of time beginning after the causing of the heat to be supplied to the interior chamber; and adjusting the amount of the heat supplied to the interior chamber by the upper heating element and the amount of the heat supplied to the interior chamber by the lower heating element after the determined period of time has elapsed. For example, the operations can further include adjusting the amount of the heat supplied to the interior chamber by the upper heating element and the amount of the heat supplied to the interior chamber by the lower heating element when the temperature of the air within the lower region of the interior chamber characterized by the temperature data is less than a target temperature. For example, the operations can further include receiving second temperature data characterizing a second temperature of the air within the interior chamber; determining whether the second temperature characterized by the received second temperature data is greater than or equal to the target temperature; and, in response to determining that the temperature characterized by the received second temperature data is greater than or equal to the target temperature, causing the upper heating element and the lower heating element to deactivate. For example, the operations can further include determining a second period of time based on the determined ratio, the second period of time different from the period of time and beginning after the causing of the heat to be supplied to the interior chamber; determining, after the second period of time has elapsed, a second ratio between the amount of heat to be supplied to the interior chamber by the upper heating element and the amount of heat to be supplied to the interior chamber by the lower heating element; and causing heat to be supplied to the interior chamber by at least one of the upper and lower heating elements based on the determined second ratio.

In another aspect, temperature data characterizing a temperature of air within an upper region of an interior chamber of a cooking device above a cooking surface and configured to receive food to be cooked and a temperature of air within a lower region of the interior chamber below the cooking surface can be received. A ratio between an amount of heat to be supplied to the interior chamber by an upper heating element and an amount of heat to be supplied to the interior chamber by a lower heating element can be determined, and the upper heating element and the lower heating element can be disposed in the interior chamber at opposing surfaces of the interior chamber. Heat can be caused to be supplied to the interior chamber by at least one of the upper and lower heating elements based on the determined ratio.

One or more of the following features can be included in any feasible combination. For example, mode data characterizing a mode of cooking the food can be received, and the ratio can be determined based on the received mode data. For example, the causing of the heat to be supplied to the interior chamber can occur when the cooking device is operating in a pre-heating state. For example, a period of time beginning after the causing of the heat to be supplied to the interior chamber can be determined based on the determined ratio, and the amount of the heat supplied to the interior chamber by the upper heating element and the amount of the heat supplied to the interior chamber by the lower heating element can be adjusted after the determined period of time has elapsed. For example, the amount of the heat supplied to the interior chamber by the upper heating element and the amount of the heat supplied to the interior chamber by the lower heating element can be adjusted when the temperature of the air within the lower region of the interior chamber characterized by the temperature data is less than a target temperature. For example, second temperature data characterizing a second temperature of the air within the upper region of the interior chamber can be received, whether the second temperature is greater than or equal to the target temperature can be determined, and, the upper heating element and the lower heating element can be deactivated in response to determining that the second temperature is greater than or equal to the target temperature.

In one aspect, a cooking device is described. The cooking device can include a housing defining an interior chamber, an upper heating element disposed within the interior chamber and on an upper surface of the housing and configured to supply heat to the interior chamber. The cooking device can also include a lower heating element disposed within the interior chamber, on a lower surface of the housing, proximate a cooking surface disposed within the interior chamber and configured to receive food to be cooked, and the lower heating element can be configured to supply heat to the interior chamber. The lower surface can be opposite the upper surface. The cooking device can also include a controller in operable communication with the upper heating element and the lower heating element. The controller can be configured to cause a first amount of heat to be generated by the upper heating element and no heat to be generated by the lower heating element when the controller is operating in a first mode, and, when a temperature of the air within an upper region of the interior chamber exceeds a predetermined threshold and when the controller is operating in the first mode, cause the controller to operate in a second mode in which a second amount of heat is generated by the upper heating element and a third amount of heat is generated by the lower heating element, the second and third amounts of heat determined by the controller and based on the temperature of the air within the upper region of the interior chamber and a temperature of a lower region of the interior chamber located below the cooking surface.

One or more of the following features can be included in any feasible combination. For example, the controller can be configured to receive data characterizing a mode of cooking the food and to determine the second and third amounts of heat based on the received data. For example, the cooking device can further include an upper temperature sensor disposed within the interior chamber and proximate the upper heating element, and the upper temperature sensor can be configured to measure the temperature of the air within the upper region of the interior chamber. For example, the cooking device can further include a lower temperature sensor disposed within the interior chamber and proximate the lower heating element and the cooking surface, and the lower temperature sensor can be configured to measure the temperature of at least one of the lower region of the interior chamber and the cooking surface. For example, the controller can be configured to cause the heat to be supplied to the interior chamber by at least one of the upper and lower heating elements when the controller is operating in a pre-heating mode. For example, the controller can be configured to adjust the second and third amounts of heat after a period of time, and the period of time can be determined based on the temperature of the air within the upper region of the interior chamber and the temperature of the air within the lower region of the interior chamber. For example, the controller can be configured to adjust the second and third amounts of heat when the temperature of the cooking surface is less than a target temperature. For example, the controller can be configured to deactivate the upper heating element when the temperature of the air within the interior chamber exceeds the predetermined threshold.

In another aspect, a system is provided and can include at least one data processor and memory storing instructions configured to cause the at least one data processor to perform operations described herein. The operations can include receiving temperature data characterizing a temperature of air within an upper region of an interior chamber of a cooking device, the upper region above a cooking surface, and characterizing a temperature of air within a lower region of the interior chamber, the lower region below the cooking surface; determining, based on the received temperature data, a first amount of heat to be supplied to the interior chamber by an upper heating element and a second amount of heat to be supplied to the interior chamber by a lower heating element, the upper heating element and the lower heating element being disposed in the interior chamber at opposing surfaces of the interior chamber; determining, during an operating mode in which a third amount of heat is supplied to the interior chamber by the upper heating element and no heat is supplied to the interior chamber by the lower heating element, whether the temperature of the air within the upper region of the interior chamber exceeds a predetermined threshold; and in response to determining that the temperature of the air within the upper region of the interior chamber exceeds the predetermined threshold, causing the first and second amounts of heat to be supplied to the interior chamber.

One or more of the following features can be included in any feasible combination. For example, the operations can further include receiving mode data characterizing a mode of cooking the food, and wherein the first and second amounts of heat are determined based on the received mode data. For example, the operations can further include adjusting the second and third amounts of heat after a period of time, and wherein the period of time is determined based on the temperature of the air within the upper region of the interior chamber and the temperature of the air within the lower region of the interior chamber. For example, the operations can further include adjusting the second and third amounts of heat when the temperature of the cooking surface is less than a target temperature. For example, the operations can further include causing the upper heating element and the lower heating element to deactivate in response to determining that the temperature of the air within the upper region of the interior chamber exceeds the predetermined threshold. For example, a portion of the temperature data can be received from a lower temperature sensor disposed within the interior chamber and proximate the lower heating element and the cooking surface, and the lower temperature sensor can be configured to measure the temperature of at least one of the lower region of the interior chamber and the cooking surface.

In another aspect, temperature data characterizing a temperature of air within an upper region of an interior chamber of a cooking device, the upper region above a cooking surface, and characterizing a temperature of air within a lower region of the interior chamber, the lower region below the cooking surface can be received. A first amount of heat to be supplied to the interior chamber by an upper heating element and a second amount of heat to be supplied to the interior chamber by a lower heating element, the upper heating element and the lower heating element being disposed in the interior chamber at opposing surfaces of the interior chamber can be determined based on the received temperature data, and the upper heating element and the lower heating element can be disposed in the interior chamber at opposing surfaces of the interior chamber. During an operating mode in which a third amount of heat is supplied to the interior chamber by the upper heating element and no heat is supplied to the interior chamber by the lower heating element, whether the temperature of the air within the upper region of the interior chamber exceeds a predetermined threshold can be determined. The first and second amounts of heat can be supplied to the interior chamber in response to determining that the temperature of the air within the upper region of the interior chamber exceeds the predetermined threshold.

One or more of the following features can be included in any feasible combination. For example, mode data characterizing a mode of cooking the food can be received, and the first and second amounts of heat can be determined based on the received mode data. For example, the second and third amounts of heat can be adjusted after a period of time, and the period of time can be determined based on the temperature of the air within the upper region of the interior chamber and the temperature of the air within the lower region of the interior chamber. For example, the second and third amounts of heat can be adjusted when the temperature of the cooking surface is less than a target temperature. For example, the upper heating element and the lower heating element can be deactivated in response to determining that the temperature of the air within the upper region of the interior chamber exceeds the predetermined threshold. For example, a portion of the temperature data can be received from a lower temperature sensor disposed within the interior chamber and proximate the lower heating element and the cooking surface, and the lower temperature sensor can be configured to measure the temperature of at least one of the lower region of the interior chamber and the cooking surface.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings, and additional examples of specific system structures, functions, manufactures, uses, and related methods can be found in U.S. application Ser. Nos. 17/733,237, 17/663,582 and 18/079,781, each of which is incorporated by reference herein in its entirety. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, cooking devices having at least one electric heating element and that are configured to cook various foods, including pizza, are provided. In some embodiments, the cooking device can include a housing having a base and a movable door coupled to the base that together define an interior cooking chamber. An upper heating element can be disposed within the interior chamber, and a lower heating element can be similarly disposed within the interior chamber opposite the upper heating element. A cooking surface, such as a cooking stone, can be disposed above the lower heating element within the cooking chamber such that food, such as a pizza, can be placed on top of the cooking stone when inserted into the interior chamber. The heating elements can be in operable communication with a controller configured to adjust the amount of heat supplied by the heating elements to the interior chamber to optimize the cooking of a food, such as pizza, placed inside the interior chamber.

Figure 1A:
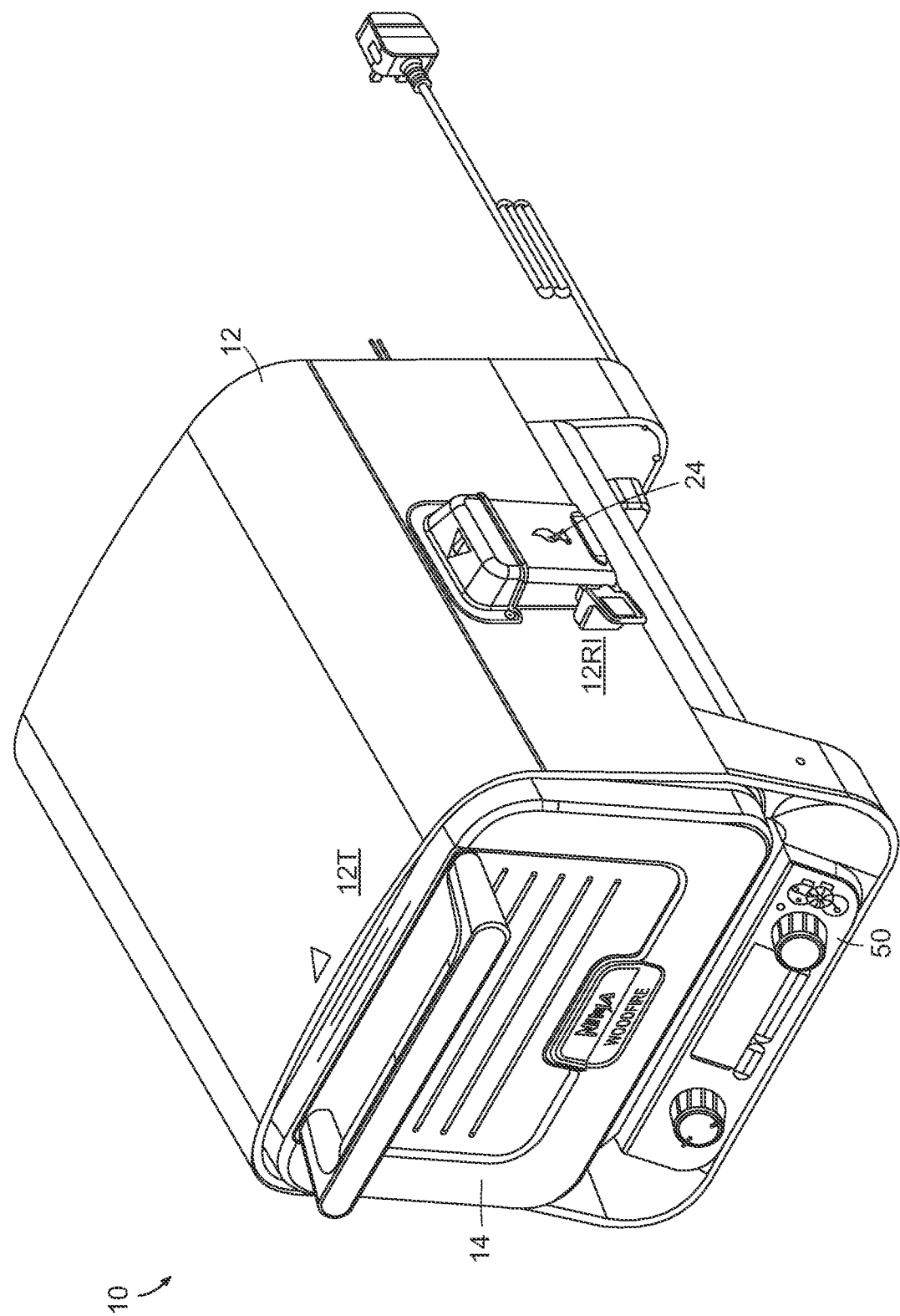
FIG. 1A is a perspective view of a cooking device according to an embodiment.
Figure 1B:
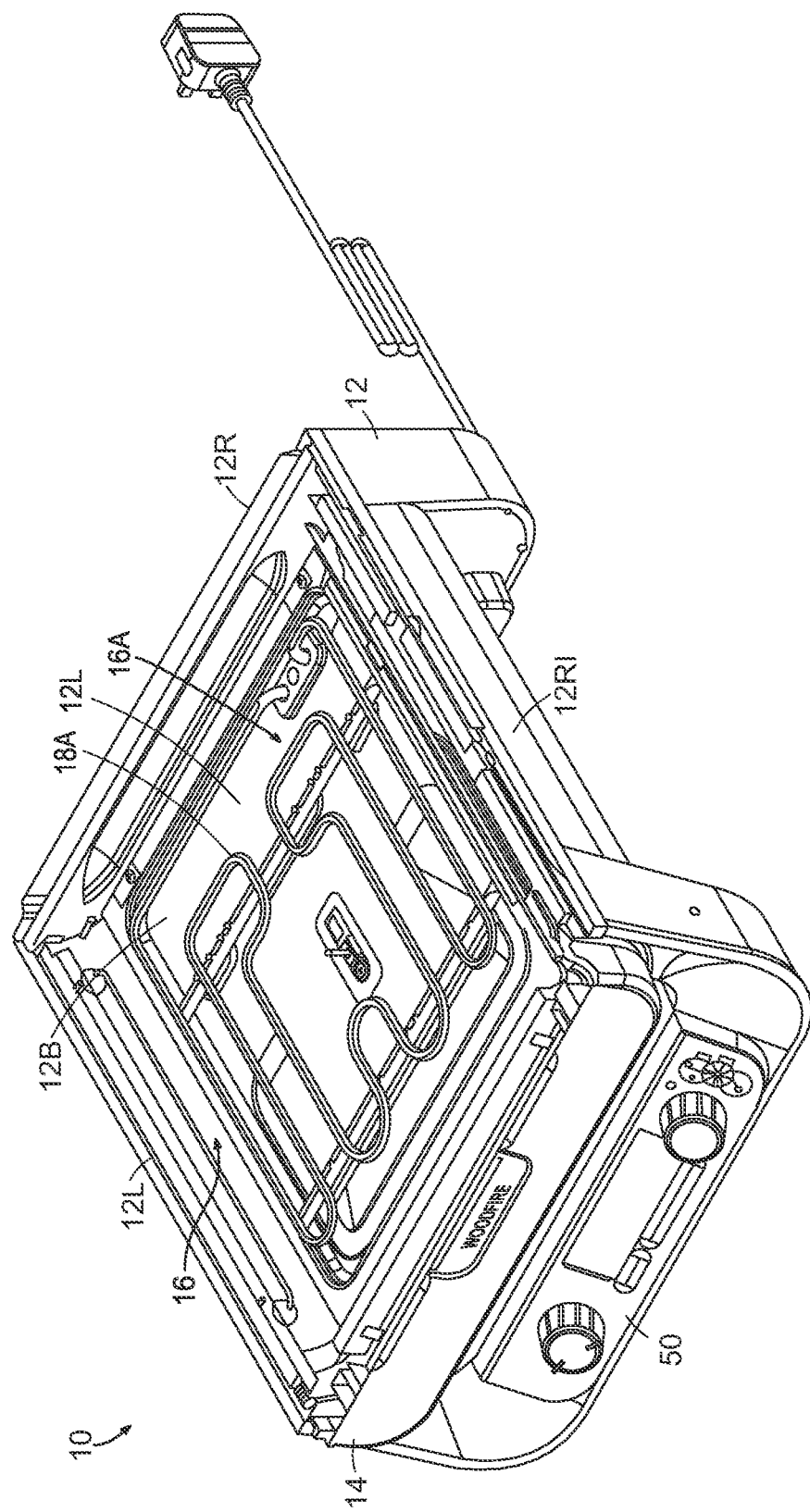
FIG. 1B is a first perspective cross-sectional view of the cooking device of FIG. 1A.
Figure 1C:
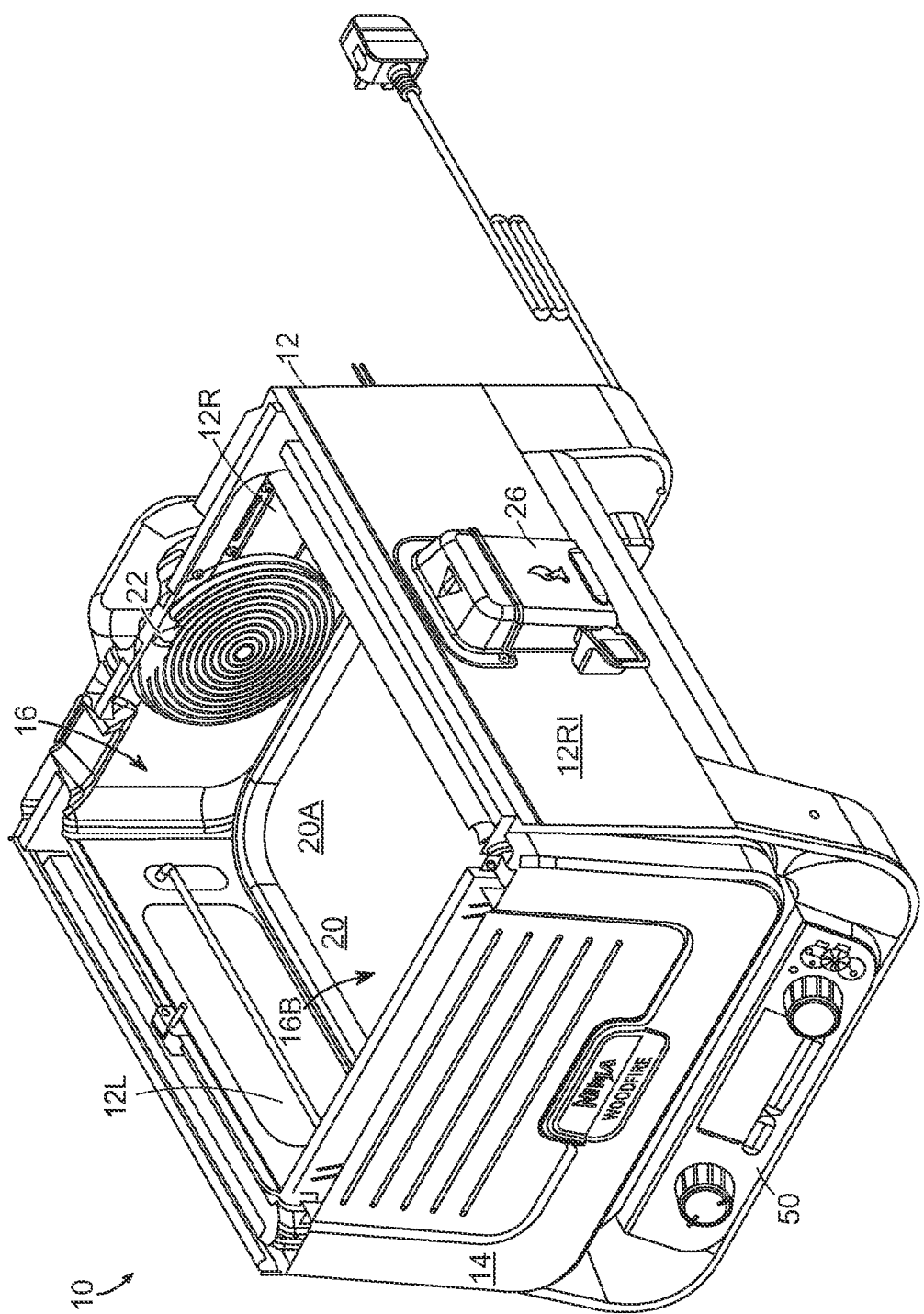
FIG. 1C is a second perspective cross-sectional view of the cooking device of FIG. 1A.
Figure 1D:
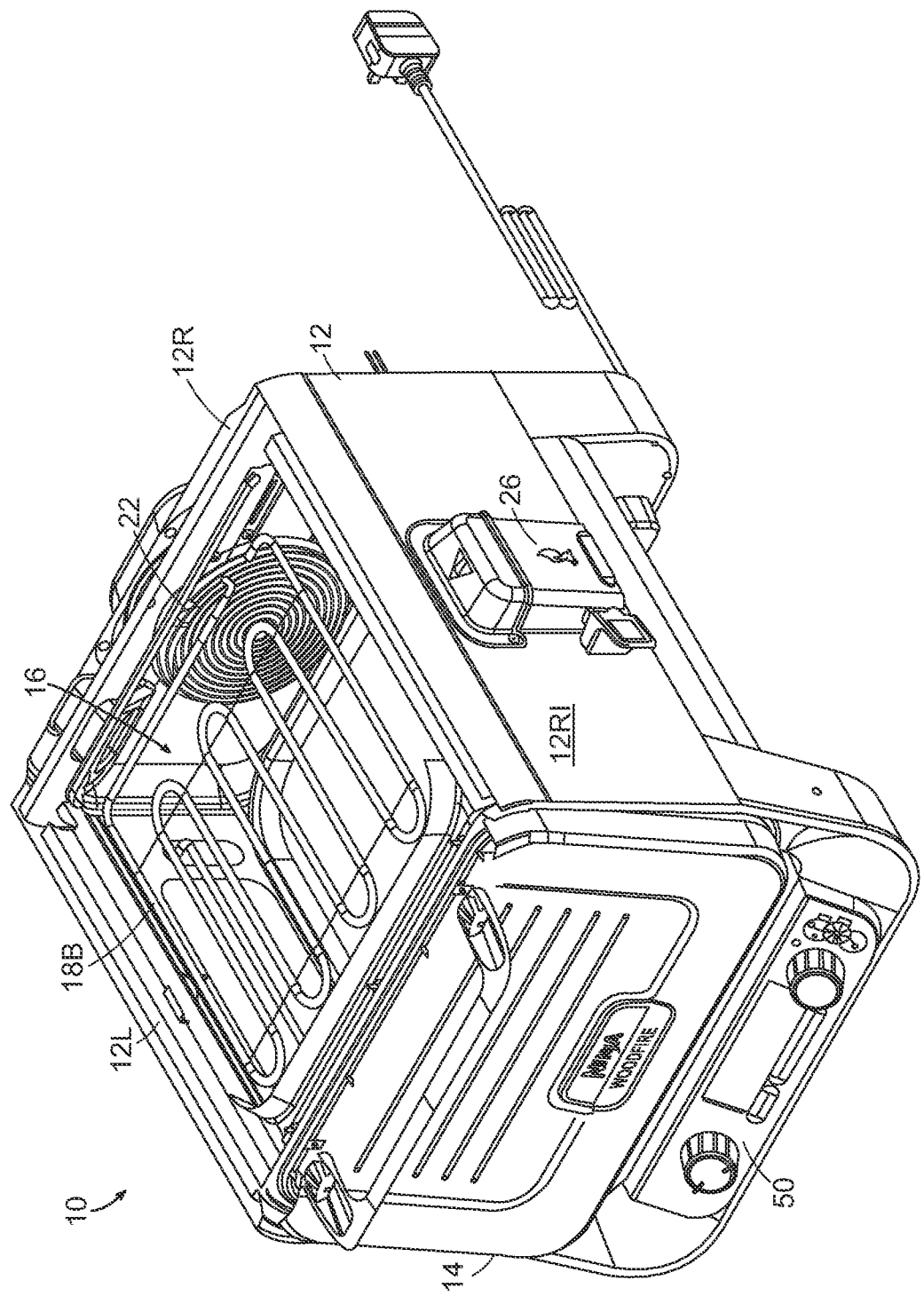
FIG. 1D is a third perspective cross-sectional view of the cooking device of FIG. 1A.
Figure 1E:
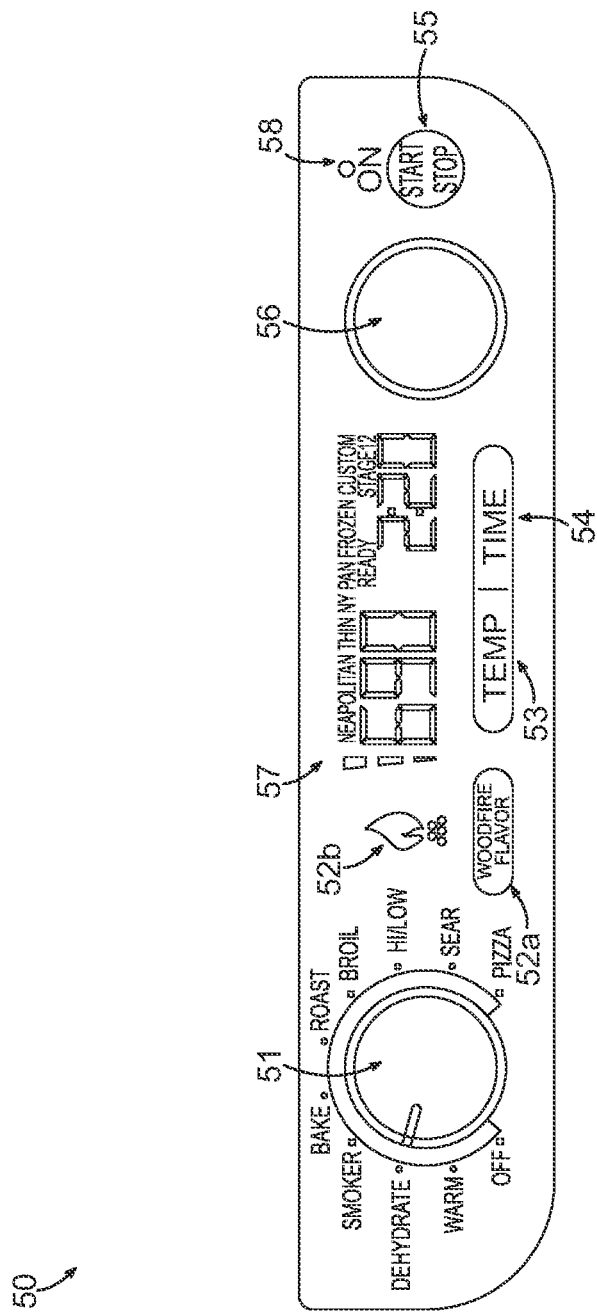
FIG. 1E is a front side view of a user interface located on a front side of the cooking device of FIG. 1A.
Figure 1F:
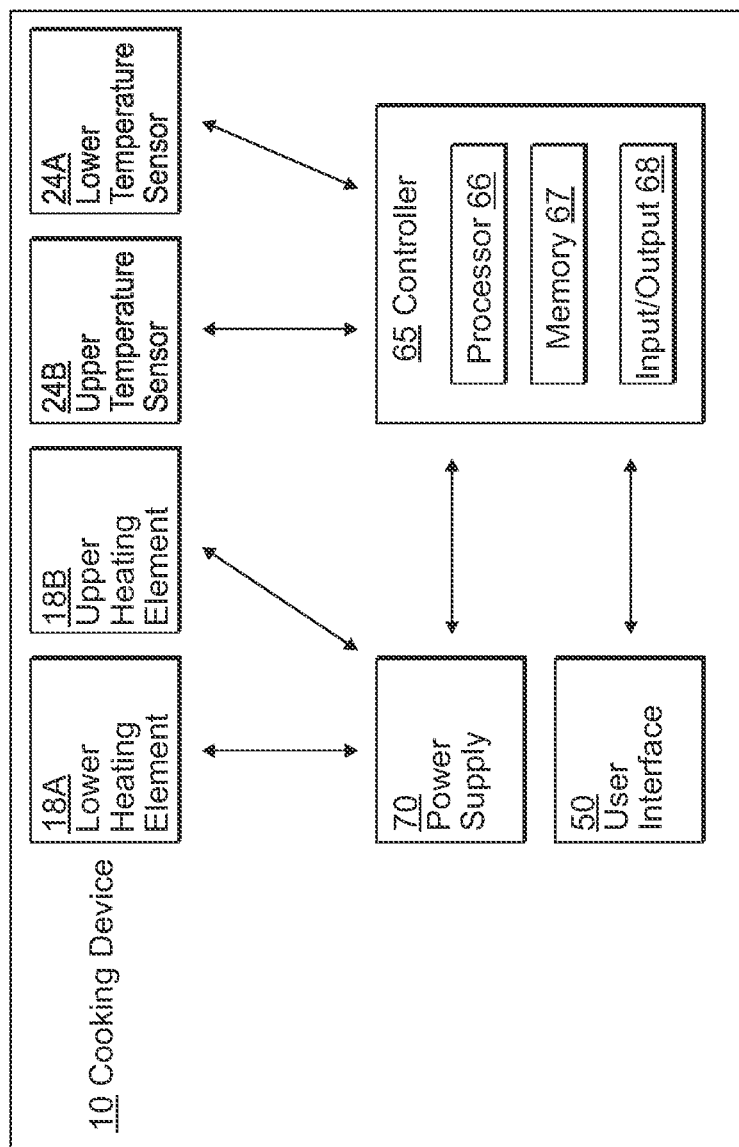
FIG. 1F is a schematic diagram illustrating components of the cooking device of FIG. 1A.

FIGS. 1A-1F illustrate an exemplary cooking device 10 having at least one electric heating element according to an embodiment. The cooking device 10 can be used to cook food in a variety of cooking modes, including conductive and convective modes (e.g., Warm, Dehydrate, Smoker, Bake, Roast, Broil, Hi/Low, Sear, Pizza, etc.). The illustrated cooking device 10 includes a base 12 and a movable door 14 movably coupled to the base 12, such as via a hinge (not shown). Together, the walls of the base 12 (e.g., a rear wall 12R, a left wall 12L, a right wall 12RI, a top wall 12T, and a bottom wall 12B as shown in FIGS. 1A-1D), and the door 14 can be referred to generally as a housing and can define an interior cooking chamber 16 that is sized to receive a variety of food products and/or food containers (e.g., a baking tray, a rack, a cooking stone, etc.). The cooking device 10 can include a lower heating element 18A disposed above a lower surface 12L of the base 12 and an upper heating element 18B that is disposed below an upper surface (not shown) of the base 12. As referenced above, the base 12 can include a cooking surface 20, such as a cooking stone (also referred to as a pizza stone), upon which a food product (e.g., a pizza) can be placed during an operating procedure of the cooking device 10 and which can be disposed above the lower heating element 16A. Each of the lower heating element 18A and the upper heating element 18B is configured to heat the cooking surface 20, the interior cooking chamber 16 and/or the food product through conduction, convection, radiation, or a combination thereof. In some embodiments, the lower heating element 18A can comprise a plurality of lower heating elements, and, in some embodiments, the upper heating element 18B can comprise a plurality of upper heating elements. The cooking device 10 can also include a fan 22, which can be operated to circulate air within the interior cooking chamber 16 during a variety of cooking modes. The fan 22 can be located within the interior cooking chamber 16 at a rear wall of the base 12, as shown in FIGS. 1C and 1D. The cooking device 10 can also include a lower temperature sensor 24A disposed below the cooking surface 20 and configured to measure a temperature of the air in a lower region 16A of the interior cooking chamber 16 that is proximate a lower surface of the cooking surface 20 (not shown). The lower surface of the cooking surface 20 is disposed opposite an upper surface 20A of the cooking surface 20 as shown in FIG. 1C, and the lower region 16A can, in some embodiments, be bounded by the bottom wall 12B, the left wall 12L, the right wall 12RI, the rear wall 12R, the door 14, and the lower surface of the cooking surface 20. In some embodiments, the lower temperature sensor 24A can be configured to measure a temperature of the lower surface of the cooking surface 20. As such, in some embodiments, lower temperature data characterizing the lower surface of the cooking surface 20 and/or the air proximate the lower surface of the cooking 20 can be acquired and/or generated by the lower temperature sensor 24A and provided to a controller (such as a controller 65, described in further detail below) for use by the controller in determining the temperature of the air proximate the lower surface of the cooking surface 20 and/or the temperature of the lower surface of the cooking surface 20. Similarly, the cooking device 10 can also include an upper temperature sensor 24B disposed in the interior cooking chamber 16 and configured to measure a temperature of the air in an upper region 16B of the interior cooking chamber 16 that is located above the cooking surface 20. In some embodiments, the upper region 16B can be bounded by the top wall 12T, the left wall 12L, the right wall 12RI, the rear wall 12R, the door 14, and an upper surface 20B of the cooking surface 20. As such, in some embodiments, upper temperature data characterizing the air in the upper region 16B of the interior cooking chamber 16 can be acquired and/or generated by the upper temperature sensor 24B and provided to a controller (such as the controller 65 described below) for use by the controller in determining the temperature of the air proximate the lower surface of the cooking surface 20. Exemplary lower and upper temperature sensors can include thermometers, thermocouples, NTC thermistors, and the like, or any collection/combination thereof. Lower and upper temperature sensors 24A, 24B are schematically illustrated in FIG. 1F, and their use is described in further detail below.

As explained above and as will be discussed in further detail below, the cooking device 10 can be pre-programmed to perform a unique cooking operation for cooking pizza based on a particular type or style of pizza, including Neapolitan style, thin-crust style, New York style, and pan style. An example of a Neapolitan style pizza can be a style of pizza featuring a relatively moist inner portion that includes pizza sauce (e.g., tomato-based sauce and the like) and pizza toppings (e.g., cheese, meat, vegetables and the like) and that is surrounded by a crust that has been subjected to a high amount of heat to thereby cause "leoparding" of the crust (e.g., the formation of relatively small blisters of heavily-cooked regions of the crust and/or larger-sized bubbles of heavily-cooked regions of the crust). In some circumstances, it can be difficult to satisfactorily cook a Neapolitan style pizza because of the difference between an amount of heat required to sufficiently cook the inner portion of the pizza and the high amount of heat required to cause the leoparding of the crust described above. For example, by failing to adequately control the high amount of heat required for leoparding, or by applying the high amount of heat required for leoparding to the crust to the inner portion, the inner portion can become overcooked and thus unsuitable for eating.

The cooking device 10 can also be pre-programmed to perform a unique cooking operation for cooking a frozen pizza. In other aspects, the cooking device 10 can be configured to cook a pizza in accordance with user-defined custom cooking parameters. As such, in some embodiments, the cooking device 10 can include a user interface 50 that permits a user to configure the cooking device 10 for performing one or more pre-programmed pizza cooking modes corresponding to one or more of the above-described styles/types of pizza. As explained above, in some embodiments, these pre-programmed pizza cooking modes can include "Neapolitan" (for cooking Neapolitan style pizza), "Thin" (for cooking thin-crust style pizza), "NY" (for cooking New York style pizza), "Pan" (for cooking pan style pizza), "Frozen" (for cooking frozen pizza), and "Custom" (for cooking a pizza in accordance with user-defined custom cooking parameters). Any of the listed operations can be used in combination with one another, both in succession or at the same time. Further, these cooking modes can combined with smoke generated by a smoke generation unit 26 (illustrated in FIGS. 1A, 1C, and 1D) integrated into the base 12. The structure and/or functionality of an exemplary embodiment of such a smoke generation unit is described in greater detail in U.S. application Ser. Nos. 17/733,237, 17/663,582 and 18/079,781 (incorporated by reference herein as described above). The user interface 50 can be located on an external portion of the cooking device 10, such as on a front face of the base 12, as seen, for example, in FIGS. 1A-1D. The user interface 50, which is shown in detail in FIG. 1E, can be in operable communication with a controller 65 (schematically illustrated in FIG. 1F). The user interface can be configured to receive inputs that cause the controller 65 to perform one or more actions responsive to the received inputs, as described in further detail below.

In some embodiments, the user interface 50 can include a variety of input buttons and controls that permit the user to configure the operation of the cooking device 10 by providing the above-described inputs. For example, in some embodiments, the user interface 50 can include a rotary function dial 51 which is configured to rotate when turned by a user, such that the user can select a pre-programmed cooking mode in which the cooking device 10 can operate. Exemplary pre-programmed cooking modes can include Warm, Dehydrate, Smoker, Bake, Roast, Broil, Hi/Low, Sear, and Pizza. The user interface 50 can also a include a smoke generation button 52a which can cause the controller 65 to activate the smoke generation unit 26 described above and thereby supply smoke to the cooking chamber 16. The user interface 50 can illuminate a smoke generation icon 52b when the smoke generation unit 26 is activated. The user interface 50 can also include temperature and time buttons 53, 54, which, when pressed, can allow the user to adjust the cooking temperature and the cooking time of the cooking device 10, which are displayed above the buttons 53, 54 as illustrated in FIG. 1E. The user interface 50 can also include a start/stop button 55, which, when pressed by a user, causes the controller 65 to start and/or stop various operations of the cooking device 10 (e.g., pre-heating, cooking, etc.). The user interface 50 can also include a start/stop dial 56 which allows the user to perform additional functionality, such as scrolling through the pizza cooking modes referenced above and as described in further detail below. The user interface 50 can also include one or more indicators which indicate a status of the cooking device 10. For example, the user interface 50 can include a pizza cooking mode indicator 57, which can illuminate an indicator corresponding to one of the above-described pizza cooking modes when that mode is selected. Similarly, the user interface 50 can also include an "On" indicator 58 which illuminates when the cooking device is in an operational state.

As schematically illustrated in FIG. 1F and as referenced above, the cooking device 10 can include a controller 65 that is in operable communication with one or more of the components described above (e.g., the user interface 50, the lower temperature sensor 24A, the upper temperature sensor 24B, etc.). As shown, the controller 65 can include at least one processor 66 and a memory 67 storing instructions which, when executed by the processor 66, can cause the at least one data processor to perform one or more of the operations described elsewhere herein. The controller 65 can also include an input/output (I/O) interface 68 that enables the processor 66 to receive commands and/or data from other components of the cooking device 10 for use in performing the operations. For example, the controller 65 can receive, through the I/O interface 68, data characterizing temperature measurements made by the lower temperature sensor 24A and/or the upper temperature sensor 24B and provide that data to the processor 66 for use in performing operations requiring the received data as an input. Similarly, the controller 65 can receive, from the user interface 50 and via I/O interface 68, data characterizing inputs received from the user by the user interface 50 and provide that data to the processor 66 for use in performing operations that require the data received from the user interface 50 as input.

As shown in FIG. 1F, the cooking device 10 can also include a power supply 70 that is configured to supply power to the lower heating element 18A and the upper heating element 18B (in addition to other components of the cooking device 10 requiring power to operate). The power supply 70 can be in operable communication with the controller 65. As such, the power supply 70 can be configured to receive commands from the controller 65 (provided via the I/O interface 68) that cause the power supply 70 to provide electrical power to the lower heating element 18A and/or the upper heating element 18B to thereby cause the lower heating element 18A and/or the upper heating element 18B to activate and provide heat to the cooking chamber 16. In some embodiments, the power delivered to the lower heating element 18A and/or the upper heating element 18B can vary based on the commands received from the controller 65. For example, the level and/or duration of power supplied to the lower heating element 18A and/or the upper heating element 18B can vary over a given period of time based on power delivery instructions characterized by the commands received from the controller 65. As a result, the level and/or duration of heat being supplied to the cooking chamber 16 can vary over the given period of time based on the commands received from the controller 65.

Figure 2:
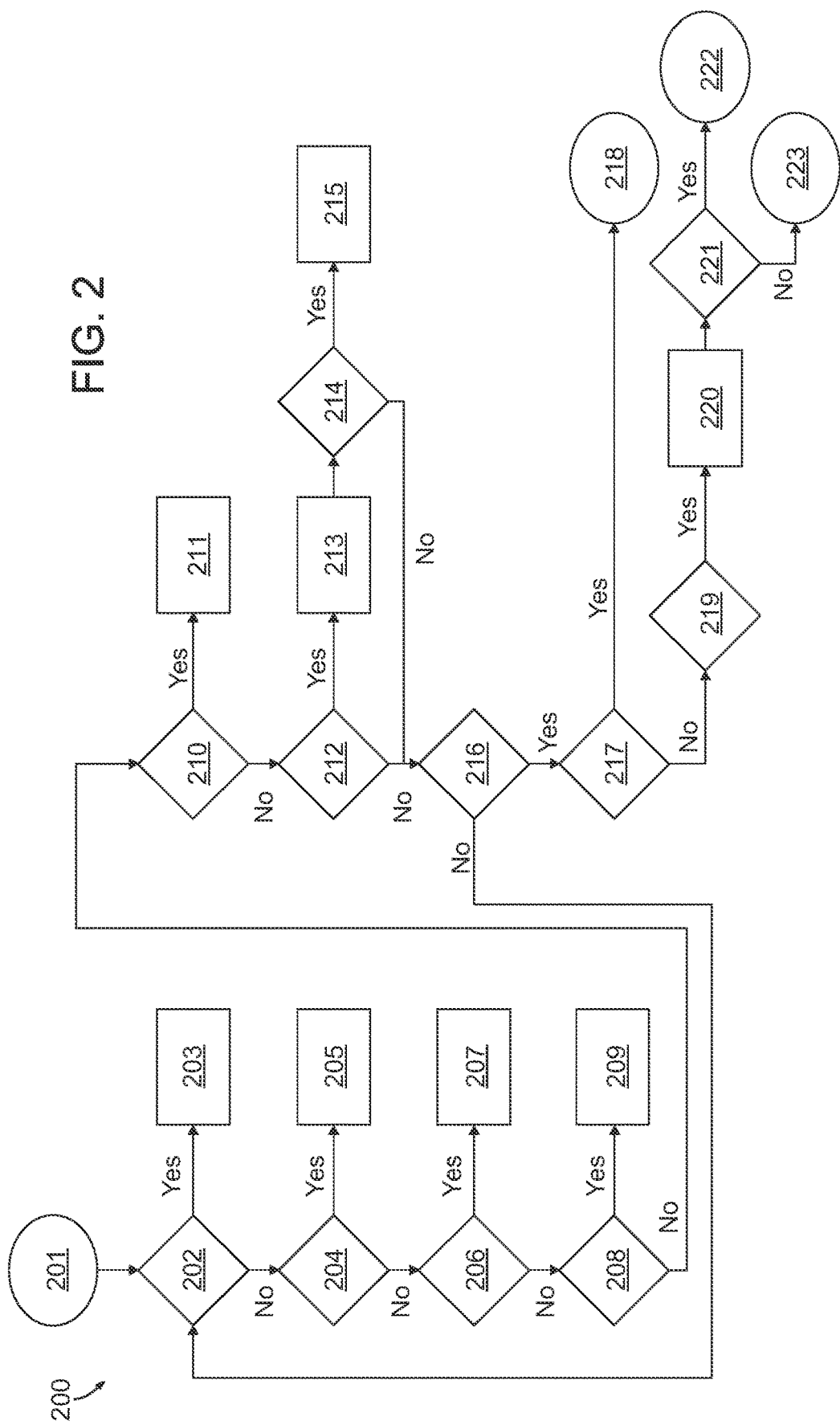
FIG. 2 is a process flow diagram illustrating an exemplary process for initializing a pre-heat function of the cooking device of FIG. 1A.

In some cooking scenarios, it can be advantageous to "pre-heat" the cooking device 10 prior to inserting the pizza into the interior cooking chamber 16. FIG. 2 illustrates an exemplary process 200 for the initializing of a pre-heat function of the cooking device 10 and which can be implemented in some embodiments of the present subject matter. As shown, the process 200 begins at 201 when a user has selected the "Pizza" cooking mode with the function dial 51.

At 201, the smoke generation icon 52b on the user interface 50 is not illuminated (which indicates that the smoke generation unit 26 is not operational), and the user interface 50 displays the default cooking time. The process then proceeds to 202, at which point the controller 65 monitors the position of the function dial 51 and determines whether the user is rotating the function dial 51. In response to determining that the user is rotating the function dial 51, the controller 51 then enters a function adjustment mode 203 in which the controller configures one or more components of the cooking device 10 in accordance with a selected one of the above-described cooking modes.

In response to determining that the user is not rotating the function dial 51, the controller monitors the position of the start/stop dial 56 and determines, at 204, whether the user is rotating the start/stop dial 56. If the controller determines that the user is rotating the start/stop dial 58, the controller then enters a pizza function adjustment mode 205. When the controller enters the pizza function adjustment mode 205, all available pizza cooking modes are illuminated on the user interface 50. By rotating the start/stop dial 58, the user can scroll through each of the pizza cooking modes (e.g., Neapolitan, Thin, NY, Pan, Frozen, and Custom) and thereby change the selected pizza cooking mode in accordance with their preference. In some embodiments, the controller 65 can also cause the user interface 50 to modify one or more aspects of the display based on the selected pizza cooking mode. For example, as the user rotates the start/stop dial 58 and scrolls through each of the pizza cooking modes, the controller 65 can update the time and/or temperature displayed on the user interface 50 to reflect a default length of cooking time and a default cooking temperature, respectively, that corresponds to the pizza cooking mode currently selected.

In response to determining, at 204, that the user is not rotating the start/stop dial 58, the controller 65 determines, at 206, whether the user has pressed the time button 53. If the controller determines that the user has pressed the time button 53, the controller then enters a time adjustment mode 207 in which the user can interact with the user interface 50 to adjust the length of the cooking time from the default length of the cooking time associated with the selected pizza cooking mode to a desired length of the cooking time.

In response to determining, at 206, that the user has not pressed the time button, the controller 65 determines, at 208, whether the user has selected the custom function by rotating the start/stop dial 56 as discussed above. If the controller 65 determines that the user has selected the custom function, the controller then enters a custom adjustment mode 209. When the controller is in the custom adjustment mode 209, the user can adjust the cooking temperature and the length of the cooking time, and the user can set a single temperature value that serves as a set point for the temperature of the cooking chamber as well as a set point for the temperature of the bottom of the cooking surface 20. When the user adjusts the cooking temperature such that the set point for the temperature of the bottom of the cooking surface 20 exceeds a first predetermined temperature threshold, the controller can determine an optimized bottom set point temperature based on the cooking temperature selected by the user.

In response to determining, at 208, that the user has not selected the custom function, the controller 65 determines, at 210, whether the user has pressed a probe button located on the user interface 50 (not shown). If the controller 65 determines that the user has pressed a probe button, the controller, at 211, causes an error notification to be presented to the user.

In response to determining, at 210, that the user has not pressed the probe button, the controller 65 determines, at 212, whether the user has pressed the smoke generation button 52a. If the controller 65 determines that the user has pressed the smoke generation button 52a, the controller then causes a smoke operating mode to activate 213. The controller 65 can determine, at 214, whether the user has pressed the smoke generation button 52a a second time and cause, at 215, the smoke generation unit 26 to exit the smoke operating mode in response to the user pressing the smoke generation button 52a a second time.

After making the determinations described above at 212 and 214, the controller 65 can determine, at 216, whether the user has pressed the start/stop button 55. If the controller 65 determines that the user has not pressed the start/stop button 55, the process then returns to 202, and the controller 65 monitors the position of the function dial 51 to determine whether the user has rotated the function dial 51 as described above.

If the controller 65 determines that the user has pressed the start/stop button 55, the controller 65 determines, at 217 whether the configuration of the cooking device 10 (e.g, the previously-determined settings/functions) is the same as that which was active during a previous period of time (e.g., the immediately preceding five minutes, etc.). If so, the pre-heat function is skipped and the initialization process 200 ends at 218.

If the controller 65 determines that the configuration of the cooking device 10 is not the same as that which was active during the previous period of time, the controller 65 determines at 219 whether the smoke mode has been activated. If so, the controller 65 causes the smoke generation unit 26 to initiate a fuel ignition process 220, an example of which is described in U.S. patent application Ser. No. 17/663,582, hereby incorporated by reference herein in its entirety, and, once complete, enables the cooking device 10 for pre-heating as described below with respect to FIG. 3A, and the initialization process ends at 222. If not, the controller 65 enables the cooking device 10 for pre-heating as described below with respect to FIG. 3A and the initialization process ends at 223. In some embodiments, if the fuel ignition process 220 has previously occurred, the pre-heating function is skipped.

Figure 3A:
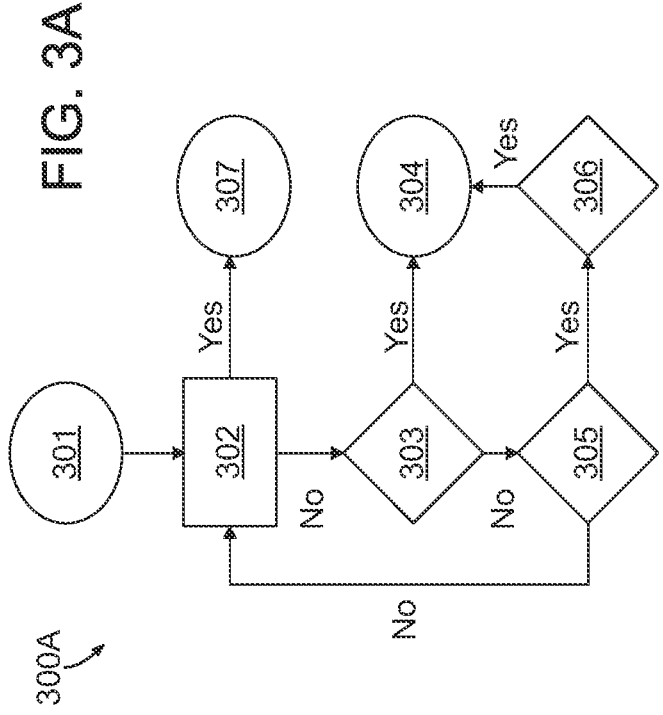
FIG. 3A is a process flow diagram illustrating an exemplary process for pre-heating the cooking device of FIG. 1A.

FIG. 3A illustrates an exemplary process 300A for controlling the pre-heating of the cooking device 10 and which can be implemented in some embodiments of the present subject matter. The process 300 begins at 301, wherein the initialization process 200 as described above with respect to FIG. 2 has ended at either of 222 or 223.

At 301, the controller 65 has begun to pre-heat the cooking chamber 16 and has updated the user interface 50 to indicate that the cooking device 10 is pre-heating the cooking chamber 16 in accordance with the pizza function selected by the user as described above. At 302, the controller 65 determines the amount of power that the power supply 70 should provide the lower heating element 18A and/or the upper heating element 18B and subsequently provides instructions to the power supply 70 that cause the power supply 70 to provide the determined amounts of power to be supplied to each of the lower and upper heating elements 18A, 18B (and thereby cause the pre-heating of the cooking chamber 16). The process by which the controller 65 determines the amount of power that the power supply 70 should provide to the lower heating element 18A and to the upper heating element 18B is described in detail below with respect to FIG. 3B.

While the cooking device is undergoing pre-heating, the controller 65 determines, at 303, whether the pre-heating of the cooking chamber 16 has occurred for a first predetermined amount of time (e.g., 35 minutes, etc.). In response to determining that the pre-heating of the cooking chamber 16 has occurred for the first predetermined amount of time, the controller 65 enables the cooking device 10 for the cooking of pizza as described below with respect to FIG. 4, and the pre-heating process 300 ends at 304. In response to determining that the pre-heating of the cooking chamber 16 has not occurred for the first predetermined amount of time, the controller 65 determines, at 305, whether the pre-heating of the cooking chamber 16 has occurred for a second predetermined amount of time (e.g., 25 minutes, etc.) that is less than the first predetermined amount of time. If the controller 65 determines that the pre-heating of the cooking chamber 16 has occurred for the second predetermined amount of time, the controller 65 determines, at 306, whether the cooking temperature is less than or equal to a second predetermined temperature threshold. In some embodiments, the second predetermined temperature threshold may be the same as the first determined temperature threshold described above. If the controller 65 determines, as part of the power amount determinations performed at 302, that the pre-heating process is complete, the controller 65 can enable the cooking device 10 for the cooking of pizzas as described below with respect to FIG. 4 and end the pre-heating process at 307.

Figure 3B:
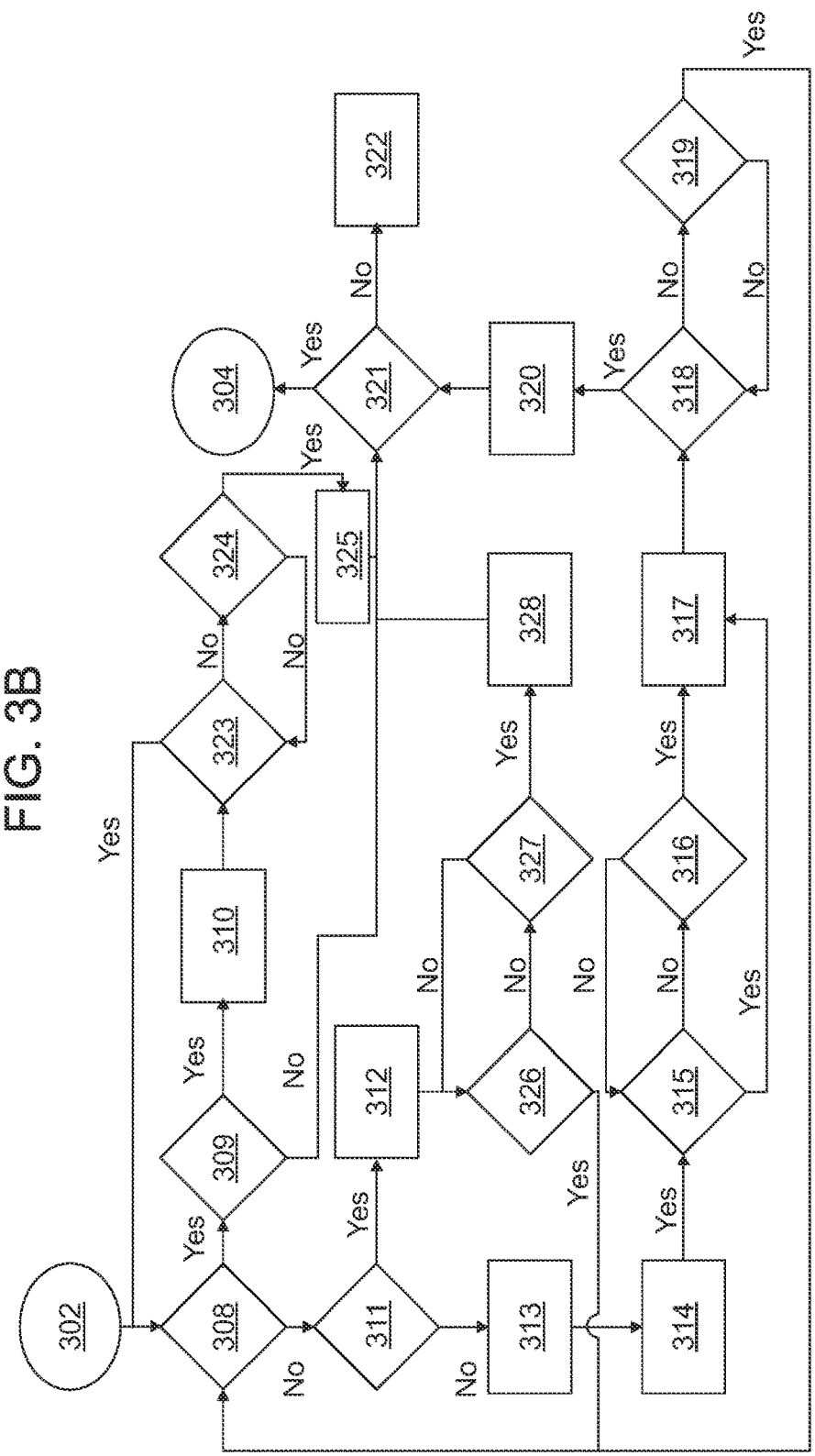
FIG. 3B is a process flow diagram illustrating an exemplary process for determining a level of power to be applied to the heating elements of the cooking device of FIG. 1A.

As explained above, at 302 of the pre-heating control process 300A, the controller 65 can determine the amount of power that should be provided to each of the lower heating element 18A and the upper heating element 18B by the power supply 70. FIG. 3B illustrates an exemplary power output calculation process 300B to be performed at 302 and which can be implemented in some embodiments of the present subject matter. As shown, at the beginning of the process 302, the controller 65 determines, at 308, whether the temperature measured with the upper temperature sensor 24B is greater than or equal to a target temperature. If the controller 65 determines that the temperature measured with the upper temperature sensor 24B is greater than or equal to the target temperature, the controller 65 then determines, at 309, whether the temperature measured with the lower temperature sensor 24A is greater than or equal to the target temperature. If the controller 65 determines that temperature measured with the lower temperature sensor 24A is less than the target temperature, the controller 65 then, at 310, causes the power supply 70 to provide no power to the upper heating element 18B and to provide full power to be supplied to the lower heating element 18A. If the controller 65 determines, at 308, that the temperature measured with the upper temperature sensor 24B is less than the target temperature, the controller then determines, at 311, whether the temperature measured with the lower temperature sensor 24A is greater than or equal to the target temperature. If the controller 65 determines at 311 that the temperature measured with y the lower temperature sensor 24A is greater than or equal to the target temperature, the controller 65 then, at 312, causes the power supply 70 to provide no power to the lower heating element 18A and full power to be supplied to the upper heating element 18B.

If the controller 65 determines at 311 that the temperature measured with the lower temperature sensor 24A is less than the target temperature, the controller 65 then, at 313, determines a power ratio characterizing the relationship between the amount of power to be supplied to the upper heating element 18B relative to the amount of power to be supplied to the lower heating element 18A. In some embodiments, the power ratio can characterize a discrepancy between an actual temperature, measured by a temperature sensor (such as the lower temperature sensor 24A and/or the upper temperature sensor 24B), and a target temperature. To determine the power ratio, in some embodiments and as explained above, the controller 65 can receive, from the upper temperature sensor 24B, upper temperature data characterizing the temperature of the air within the cooking chamber 16, and the controller 65 can receive, from the lower temperature sensor 24A, lower temperature data characterizing the temperature of the bottom of the cooking surface 20. The controller 65 can determine the power ratio based on the received upper temperature data, the received lower temperature data, and the target temperature.

The controller 65 also, at 313, determines a lower heating element energy value, which characterizes a portion of available energy that is dedicated to the lower heating element 18A and that is above and beyond a predetermined minimum lower heating element power value when the temperature measured with the lower temperature sensor 24A and the temperature measured with the upper temperature sensor 24B are below their respective target temperatures. Additionally, the controller 65, at 313, determines an upper heating element energy value, which characterizes a portion of available energy that is dedicated to the upper heating element 18B and that is above and beyond a predetermined minimum upper heating element power value when the temperature measured with the lower temperature sensor 24A and the temperature measured with the upper temperature sensor 24B are below their respective target temperatures. The controller 65 determines the lower heating element energy value based on the determined power ratio, the minimum lower heating element power value, and the minimum upper heating element power value. Additionally, the controller 65 determines the upper heating element energy value based on the minimum lower heating element power value, the minimum upper heating element power value, and the determined lower heating element energy value.

The controller 65, at 313, determines a lower heating portion value that characterizes a portion of the available energy allocated to the lower heating element 18A when each of the temperature measured with the lower temperature sensor 24A and the temperature measured with the upper temperature sensor 24B are below their respective target temperatures. And, similarly, the controller 65, at 313, determines an upper heating portion value that characterizes a portion of the available energy allocated to the upper heating element 18B when each of the temperature measured with the lower temperature sensor 24A and the temperature measured with the upper temperature sensor 24B are below their respective target temperature. The controller 65 determines the lower heating portion value based on the minimum lower heating element power value and the determined lower heating element energy value, and the controller 65 can determine the upper heating portion value based on the minimum upper heating element power value and the determined upper heating element energy value.

In some embodiments, the controller 65 can determine the lower heating element energy value without regard to the predetermined minimum lower heating element power value. In this case, the lower heating element energy value characterizes a portion of available energy that is dedicated to the lower heating element 18A. As such, the controller 65 can determine the lower heating element energy value based on the determined power ratio. And, as such, the controller 65 can determine the lower heating portion value based on the determined lower heating element energy value. Similarly, in some embodiments, the controller 65 can, at 313, determine the upper heating element energy value without regard to the predetermined minimum upper heating element power value. In this case, the upper heating element energy value characterizes a portion of available energy that is dedicated to the upper heating element 18B. As such, the controller 65 can determine the upper heating element energy value based on the determined lower heating element energy value. And, as such, the controller 65 can determine the upper heating portion value based on the determined upper heating element energy value.

Once the controller 65 has made the above-described determinations at 313, the controller 65, at 314, causes the lower heating element 18A to operate at full power and the upper heating element 18B to be deactivated. At 315, the controller 65 determines whether the temperature measured with the lower temperature sensor 24A is greater than or equal to the target temperature. If the controller 65 determines that the temperature measured with the lower temperature sensor 24A is less than the target temperature, the controller 65 then determines, at 316 and based on the lower heating portion value, a portion of a predefined time interval during which the lower heating element 18A is activated and whether that portion of the predefined time interval has elapsed. If so, the controller 65, at 317, causes the lower heating element 18A to deactivate and the upper heating element 18B to activate at full power. If not, the controller 65 re-determines, at 315, whether the temperature measured with the lower temperature sensor 24A is greater than or equal to the target temperature. If, at 315, the controller 65 determines that the temperature measured with the lower temperature sensor 24A is greater than or equal to the target temperature, the controller bypass the determination at 316 and causes the lower heating element 18A to deactivate and the upper heating element 18B to activate at full power at 317.

At 318, the controller 65 receives data characterizing temperatures measured by the upper temperature sensor 24B and determines, based on the received temperature data, whether the temperature of the air measured with the upper temperature sensor 24B is greater than or equal to the target temperature. If the controller 65 determines at 318 that the temperature measured with the upper temperature sensor 24B is less than the target temperature, the controller 65 then determines, at 319 and based on the upper heating portion value, a portion of a predefined time interval during which the upper heating element 18B is activated and whether that portion of the predefined time interval has elapsed. If so, the controller 65 then returns to 308 to re-determine whether the temperature measured with the upper temperature sensor 24B is greater than or equal to the target temperature and performs one or more of the operations based on the results of that determination as described elsewhere herein. If not, the controller 65 then returns to 318 to re-determine whether the temperature measured with the upper temperature sensor 24B is greater than or equal to the target temperature. If the controller 65 determines, at 318, that the temperature measured with the upper temperature sensor 24B is greater than or equal to the target temperature, the controller 65 deactivates the upper heating element 18B and the lower heating element 18A at 320. At 321, the controller 65 determines whether the cooking device 10 is operating in a pre-heat state. If so, the system ends the pre-heating process at 304 (as also illustrated in FIG. 3A). If not, the controller 65, at 322, updates the user interface 50 to display the default temperature setting for the selected pizza function as well as a countdown timer that indicates the amount of time remaining during the pre-heating process.

As explained above, the controller 65, at 309, determines whether the temperature measured with the lower temperature sensor 24A is greater than or equal to the target temperature. If the controller 65 determines that the temperature measured with the lower temperature sensor 24A is greater than or equal to the target temperature, the controller 65 then performs the functionality described above at 321.

Additionally, as explained above, if, at 309, the controller 65 determines that the temperature measured with the lower temperature sensor 24A is less than the target temperature, the controller 65 then, at 310, causes no power to be supplied to the upper heating element 18B and full power to be supplied to the lower heating element 18A. When this occurs, the controller 65 determines, at 323, whether the lower heating element 18A has been activated for a first predefined period of time (e.g., 30 seconds). If the controller 65 determines that the lower heating element 18A has been activated for the first predefined period of time, the controller 65 returns to 308 to re-determine whether the temperature the temperature measured with the upper temperature sensor 24B is greater than or equal to the target temperature. If the controller 65 determines that the lower heating element 18A has been activated for less than the first predefined period of time, the controller 65 then, at 324, determines whether the temperature measured with the lower temperature sensor 24A is greater than or equal to the target temperature. If so, the controller 65, at 325, causes the lower and upper heating elements 18A, 18B to deactivate and then performs the functionality described above at 321.

In addition, as explained above, if the controller 65 determines, at 311, that the temperature measured with the lower temperature sensor 24A is greater than or equal to the target temperature, the controller 65 then, at 312, causes no power to be supplied to the lower heating element 18A and full power to be supplied to the upper heating element 18B. When this occurs, the controller 65 determines, at 326, whether the upper heating element 18B has been activated for a second predefined period of time (e.g., 30 seconds). If the controller 65 determines that the upper heating element 18B has been activated for a second predefined period of time, the controller 65 returns to 308 to re-determine whether the temperature the temperature measured with the upper temperature sensor 24B is greater than or equal to the target temperature and performs one or more of the operations based on the results of that determination as described elsewhere herein. If the controller 65 determines that the lower heating element 18A has been activated for less than the second predefined period of time, the controller 65 then, at 327, determines whether the temperature measured with the upper temperature sensor 24B is greater than or equal to the target temperature. If so, the controller 65, at 328, turns off the upper and lower heating elements 18A, 18B and then performs the functionality described above at 321.

However, in some embodiments, the pre-heat function can be skipped in response to the occurrence of one or more events. For example, in some embodiments, the pre-heat function can be skipped by a user pushing and holding down the start/stop dial 56 for a certain period of time. And, as another example, in some embodiments, the pre-heat function can be skipped if the temperature of the air within the cooking chamber exceeds a target temperature for a particular pizza cooking mode at the time the pizza cooking mode is selected as described above.

Figure 4:
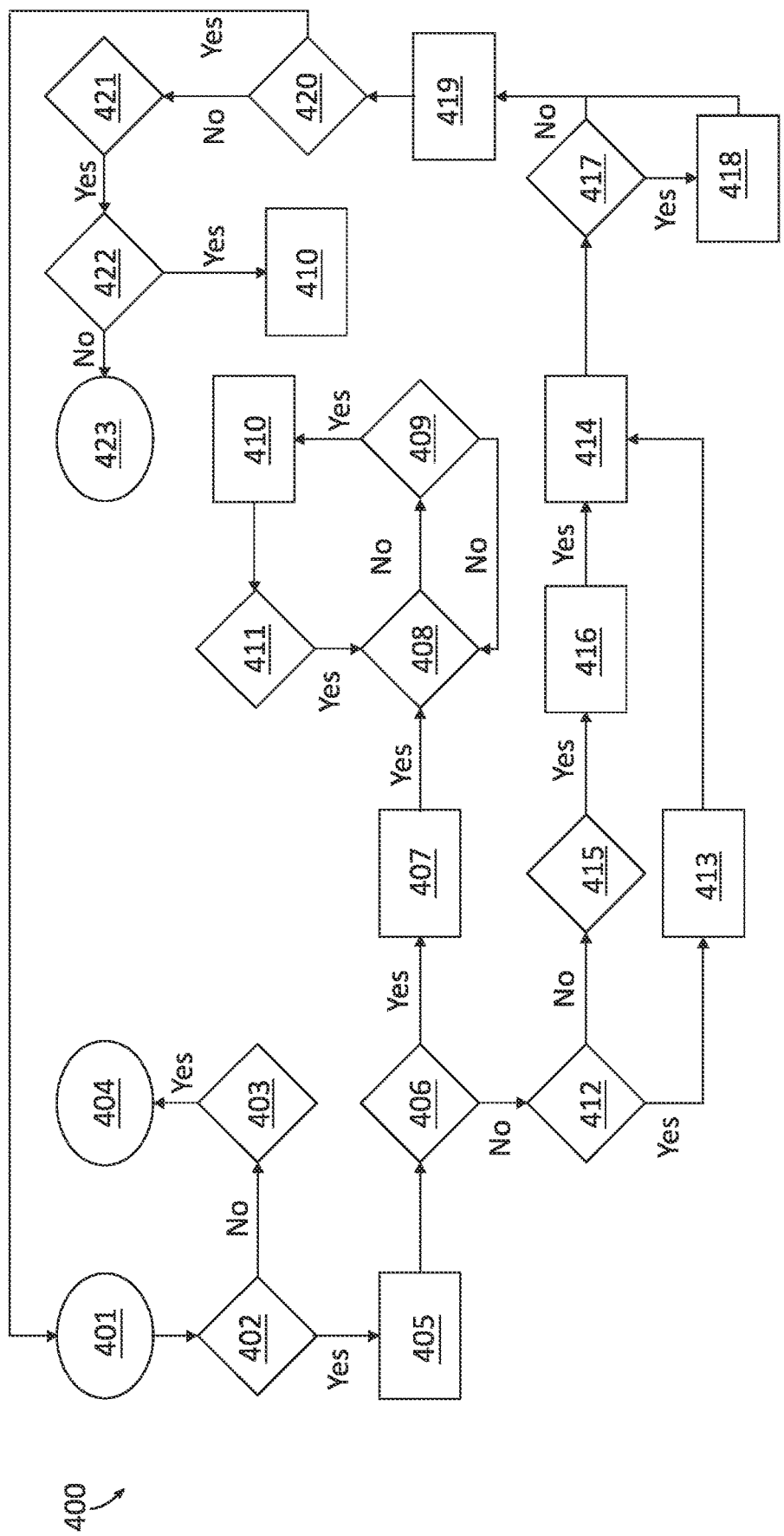
FIG. 4 is a process flow diagram illustrating an exemplary process for cooking a pizza with the cooking device of FIG. 1A.

FIG. 4 illustrates an exemplary process 400 for controlling the pizza cooking function of the cooking device 10 and which can be implemented in some embodiments of the present subject matter. In some embodiments, process 400 can occur after the pre-heating process 300a described above has concluded. The process 400 begins at 401, at which point the controller 65 causes power to be supplied as appropriate to the upper heating element 18B and the lower heating element 18A and such that the pre-heat set temperature is maintained in accordance with the pizza cooking mode selected in the manner described above. The controller 65 then, at 402, determines whether the user has pressed the start/stop button 55 on the user interface 50. If not, the controller 65 then, at 403, determines whether a certain period of time (e.g., an hour, etc.) has elapsed since the beginning of process 400 without the user having pressed the start/stop button 55. If not, the user interface displays a periodic notification to the user. If so, the controller 65 causes the cooking device 10 to deactivate, ending the process at 404.

In response to determining at 402 that the user has pressed the start/stop button 55, then, the controller 65 then activates one or more of the heating elements to begin to cook the pizza at 405. The controller 65 causes the upper and/or lower heating elements 18A, 18B to activate in accordance with the pizza function selected by the user. For example, if the user has selected Neapolitan as the pizza cooking mode, the controller 65 only activates the upper heating element 18B and deactivates the lower heating element 18A. For example, if the user has selected one of the other pizza cooking modes described above, the controller 65 determines the amount of power that the power supply 70 is to provide to the upper heating element 18B and to the lower heating element 18A independently by executing the process 300B described above with respect to FIG. 3B. Once the controller 65 has made that determination, the controller 65 then causes the power supply 70 to supply the determined amount of power to each of the upper heating element and the lower heating element 18A.

If the user has selected the Neapolitan pizza function, the controller 65 determines, at 406, whether the temperature measured with the upper temperature sensor 24B exceeds a first predetermined threshold (e.g., 750 degrees Fahrenheit). If so, then the controller 65 causes the upper heating element 18B to deactivate and the lower heating element 18A to activate at full power at 407. After adjusting the operation of the heating elements at 407 and when in the Neapolitan mode, the controller 65 determines, at 408, whether the temperature measured with the upper temperature sensor 24B, as measured by the upper temperature sensor 24B, exceeds a second predetermined threshold (e.g., 700 degrees Fahrenheit). If not, then, the controller 65 determines, at 409, whether the temperature measured with the lower temperature sensor 24A exceeds a predetermined threshold (e.g., 700 degrees Fahrenheit). If the controller 65 determines that the temperature measured with the lower temperature sensor 24A has exceeded the predetermined threshold, (e.g., 700 degrees Fahrenheit), then the controller 65, at 410, deactivates the lower heating element 18A and the upper heating element 18B (if not previously deactivated), determines whether a predetermined period of time (e.g., 5 seconds) has passed, and returns to 408 to re-determine whether the temperature of the air in the cooking chamber 16 exceeds the first predetermined threshold (e.g., 700 degrees Fahrenheit). If not, the controller returns to 408 to monitor the temperature of the air in the cooking chamber 16 and re-determine whether the temperature measured with the upper temperature sensor 24B exceeds the first predetermined threshold (e.g., 700 degrees Fahrenheit). In some embodiments, the controller can reactivate the lower heating element 18A and/or the lower heating element 18B in response to determining whether the temperature measured with the lower temperature sensor 24A and/or the temperature measured with the upper temperature sensor 24B has exceeded a predetermined threshold. In some embodiments, if the controller 65 determines that the temperature measured with the upper temperature sensor 24B has exceeded the predetermined threshold, (e.g., 700 degrees Fahrenheit), then the controller 65 deactivates the lower heating element 18A and the upper heating element 18B (if not previously deactivated) and re-executes the process 300B described above to pre-heat the cooking chamber 16 as quickly as possible.

During the period of time that the cooking device 10 is cooking the pizza, a user can press the start/stop button 55 on the user interface 50 to pause cooking. As such, during cooking, if the controller 65 determines, at 412, that the start/stop button 55 has been pressed by the user, the controller 65 causes, at 413, the heating elements 18A and/or 18B to deactivate and a notification to be displayed on the user interface 50 indicating that the cooking process has ended and instructing the user to add additional food to the cooking chamber 16 and to resume cooking by pressing the start/stop button 55. When this occurs, the controller 65, at 414, re-executes the process 300B described above to maintain the level of heat required for the selected pizza cooking mode in the cooking chamber 16.

If the controller 65 determines at 412 that the user has not pressed the stop/start button 55 when the pizza is being cooked, cooking continues in accordance with the time and temperature settings of the selected pizza cooking mode. As the cooking device 10 continues to cook the pizza, the controller 65 monitors the length of time during which the pizza is being cooked. When the controller 65 determines, at 415, that the time allotted for cooking of the pizza and specified by the selected pizza cooking mode has elapsed, the controller 65, at 416, causes a notification to be displayed on the user interface indicating that the pizza has been cooked and instructing the user to remove the cooked pizza. Once this occurs, the controller 65, at 414, re-executes the process 300B described above to pre-heat the cooking chamber 16 as quickly as possible following the cooking of the first pizza. After initializing the second pre-heat process at 414, the controller 65 monitors the temperature measured with the lower temperature sensor 24A and the temperature measured with the upper temperature sensor 24B and determines whether those temperatures have reached their respective target temperatures at 417. In response to determining, at 417, that both target temperatures have been met, the controller 65 causes a notification to appear on the user interface 50 indicating that the second pre-heat process has ended at 419 and that the cooking device 10 is ready to end the pre-heating process described above and cause the cooking process 400 to begin once again at 401 in response to determining that a user has the start/stop button 55 on the user interface 50 at 420. If the controller 65 determines, at 420, that a user has failed to press the start/stop button to restart the cooking process, and, at 421, that a predefined period of time (e.g., an hour) has elapsed since the end of the second pre-heating process, and, at 22, that no other cooking process is actively running, the controller 65 causes the cooking device to turn off at 423.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A cooking device, comprising:
   a housing defining an interior chamber;
   an upper heater disposed within the interior chamber and on an upper surface of the housing, the upper heater configured to supply heat to the interior chamber;
   a lower heater disposed within the interior chamber, on a lower surface of the housing, and proximate a cooking surface disposed within the interior chamber and configured to receive food to be cooked, the lower heater configured to supply heat to the interior chamber, the lower surface opposite the upper surface; and
   a controller in operable communication with the upper heater and the lower heater, the controller configured to receive, from a first temperature sensor, temperature data characterizing a temperature of air within an upper region of the interior chamber, the upper region above a cooking surface, and receive, from a second temperature sensor, temperature data characterizing a temperature of air within a lower region of the interior chamber, the lower region below the cooking surface, to determine a ratio between an amount of heat to be supplied to the interior chamber by the upper heater and an amount of heat to be supplied to the interior chamber by the lower heater based on the temperature data, and wherein the controller is configured to adjust the amount of the heat to be supplied to the interior chamber by at least one of the upper and lower heaters after a period of time, wherein the period of time is determined based on the determined ratio.

2. The cooking device of claim 1, wherein the controller is configured to receive data characterizing a mode of cooking the food and to determine the ratio based on the received data.

3. The cooking device of claim 1, further comprising the first temperature sensor, wherein the first temperature sensor is disposed within the interior chamber and proximate the upper heater, the first temperature sensor configured to measure the temperature of the air within the interior chamber above the cooking surface.

4. The cooking device of claim 1, further comprising the second temperature sensor, wherein the second temperature sensor is disposed within the interior chamber and proximate the lower heater and the cooking surface, the second temperature sensor configured to measure the temperature of at least one of the cooking surface and the air within the lower region of the interior chamber.

5. The cooking device of claim 1, wherein the controller is configured to cause the heat to be supplied to the interior chamber by at least one of the upper and lower heaters based on the determined ratio when the controller is operating in a pre-heating state.

6. The cooking device of claim 1, wherein the controller is configured to adjust the amount of the heat supplied to the interior chamber by the upper heater and the amount of the heat supplied to the interior chamber by the lower heater when the temperature of the air within the lower region of the interior chamber is less than a target temperature.

7. A system comprising:
at least one data processor; and
memory storing instructions, which when executed by the at least one data processor, cause the at least one data processor to perform operations comprising:
receiving, from a first temperature sensor, temperature data characterizing a temperature of air within an upper region of an interior chamber of a cooking device, the upper region above a cooking surface, and receiving, from a second temperature sensor, temperature data characterizing a temperature of air within a lower region of the interior chamber, the lower region below the cooking surface;
determining, based on the received temperature data, a ratio between an amount of heat to be supplied to the interior chamber by an upper heater and an amount of heat to be supplied to the interior chamber by a lower heater, the upper heater and the lower heater being disposed in the interior chamber at opposing surfaces of the interior chamber;
determining a period of time based on the determined ratio, the period of time beginning after the causing of the heat to be supplied to the interior chamber; and
adjusting the amount of heat to be supplied to the interior chamber by at least one of the upper and lower heaters after the period of time based on the determined ratio.

8. The system of claim 7, wherein the operations further comprise receiving mode data characterizing a mode of cooking the food, and wherein the ratio is determined based on the received mode data.

9. The system of claim 7, wherein the causing of the heat to be supplied to the interior chamber occurs when the cooking device is operating in a pre-heating state.

10. The system of claim 7, wherein the operations further comprise adjusting the amount of the heat supplied to the interior chamber by the upper heater and the amount of the heat supplied to the interior chamber by the lower heater when the temperature of the air within the lower region of the interior chamber characterized by the temperature data is less than a target temperature.

11. The system of claim 10, wherein the operations further comprise:
receiving second temperature data characterizing a second temperature of the air within the interior chamber;
determining whether the second temperature characterized by the received second temperature data is greater than or equal to the target temperature; and
in response to determining that the temperature characterized by the received second temperature data is greater than or equal to the target temperature, causing the upper heater and the lower heater to deactivate.

12. The system of claim 11, wherein the operations further comprise:
determining a second period of time based on the determined ratio, the second period of time different from the period of time and beginning after the causing of the heat to be supplied to the interior chamber;
determining, after the second period of time has elapsed, a second ratio between the amount of heat to be supplied to the interior chamber by the upper heater and the amount of heat to be supplied to the interior chamber by the lower heater; and
causing heat to be supplied to the interior chamber by at least one of the upper and lower heaters based on the determined second ratio.

* * * * *